(12) United States Patent
Muto et al.

(10) Patent No.: US 9,369,676 B2
(45) Date of Patent: Jun. 14, 2016

(54) IMAGE SERVER, IMAGE DELIVER BASED ON IMAGE INFORMATION AND CONDITION, AND IMAGE DISPLAY TERMINAL

(75) Inventors: Kenji Muto, Kariya (JP); Kazuoki Matsugatani, Kariya (JP); Jun Kosai, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 747 days.

(21) Appl. No.: 13/423,514

(22) Filed: Mar. 19, 2012

(65) Prior Publication Data

US 2012/0176500 A1   Jul. 12, 2012

Related U.S. Application Data

(60) Division of application No. 11/294,882, filed on Dec. 6, 2005, now abandoned, which is a continuation of application No. PCT/JP2004/008112, filed on Jun. 10, 2004.

(30) Foreign Application Priority Data

Jun. 12, 2003 (JP) ................. 2003-167806

(51) Int. Cl.
 *H04N 7/18* (2006.01)
 *G08G 1/0962* (2006.01)
(52) U.S. Cl.
 CPC ............ *H04N 7/18* (2013.01); *G08G 1/0962* (2013.01)
(58) Field of Classification Search
 USPC ........................................................ 348/148
 See application file for complete search history.

(56) References Cited

U.S. PATENT DOCUMENTS 5,043,816 A * 8/1991 Nakano et al. ........... 348/333.01
6,169,940 B1   1/2001 Jitsukata et al.
(Continued)

FOREIGN PATENT DOCUMENTS

JP   9-52555     2/1997
JP   2000-172981 6/2000
(Continued)

OTHER PUBLICATIONS

Official Action dated Sep. 2, 2008 in Japanese Applicatin No. 2003-167806 with English translation.

(Continued)

*Primary Examiner* — Richard Torrente
(74) *Attorney, Agent, or Firm* — Harness, Dickey & Pierce, P.L.C.

(57) ABSTRACT

Images are efficiently collected or delivered so that uncomfortable feeling given to users who view picked images picked up at vehicles and delivered by an image server is lessened. An image server is so constructed that the following operation is performed: the picked image of the surroundings of a vehicle, picked up with a camera mounted on the vehicle, and the image pickup information of the picked image, including information about the image pickup point, are stored on a storing medium; and picked images stored on the storing medium are delivered to users who view received picked images. One is selected from among picked images inputted from a vehicle with respect to each of areas to which the image pickup points of those picked images belong based on the image pickup information and a predetermined selection condition. The selected picked image is stored on the storing medium.

1 Claim, 22 Drawing Sheets

(56) References Cited

U.S. PATENT DOCUMENTS

| | | | |
|---|---|---|---|
| 6,285,949 | B1 | 9/2001 | Roediger |
| 6,351,710 | B1 * | 2/2002 | Mays .......................... 701/533 |
| 6,747,554 | B1 | 6/2004 | Higashimura et al. |
| 2001/0021277 | A1 | 9/2001 | Hamamura |
| 2002/0041717 | A1 | 4/2002 | Murata et al. |
| 2003/0081934 | A1 | 5/2003 | Kirmuss |
| 2003/0193610 | A1 * | 10/2003 | Nozaki et al. ................ 348/345 |
| 2003/0212567 | A1 * | 11/2003 | Shintani et al. ................... 705/1 |
| 2004/0130501 | A1 | 7/2004 | Kondo et al. |
| 2005/0137794 | A1 | 6/2005 | Cui |

FOREIGN PATENT DOCUMENTS

| | | |
|---|---|---|
| JP | 2001-14332 | 1/2001 |
| JP | 2001-184595 | 7/2001 |
| JP | 2001-236509 | 8/2001 |
| JP | 2002-99537 | 4/2002 |
| JP | 2002-236990 | 8/2002 |
| JP | 2002-318127 | 10/2002 |
| JP | 2002-344962 | 11/2002 |
| JP | 2003-30201 | 1/2003 |
| JP | 2003-85690 | 3/2003 |
| JP | 2003-123190 | 4/2003 |
| JP | 2003-162793 | 6/2003 |

OTHER PUBLICATIONS

Official Action dated Aug. 8, 2008 in Chinese Application No. 2004 8001 6086.1.

Official Action dated Jun. 3, 2008 in Japanese Application No. 2003-167806 with English translation.

Office Action dated Dec. 11, 2012 mailed in the family U.S. Appl. No. 13/370,430.

Office Action dated Mar. 19, 2013 mailed in the family U.S. Appl. No. 13/370,430.

Advisory Action dated May 15, 2013 issued in the family U.S. Appl. No. 13/370,430.

* cited by examiner

FIG. 3

```
<?xml version="1.0" encoding="Shift_JIS"?>
<profile id="0001">
  <file name="Cap0001.jpg">                    ← IMAGE FILE NAME
    <position>
      <latitude>
        <NS>N</NS>
        <deg>35</deg>
        <min>7</min>
        <sec>13.692000</sec>
      </latitude>
      <longitude>
        <EW>E</EW>                              ← INFORMATION ABOUT
        <deg>137</deg>                            IMAGE PICKUP POSITION
        <min>4</min>
        <sec>41.981998</sec>
      </longitude>
      <mapcode/>
    </position>
    <time>
      <year>02</year>
      <month>3</month>                          ← INFORMATION ABOUT
      <day>1</day>                                IMAGE PICKUP TIME
      <hour>10</hour>
      <min>44</min>
      <sec>46</sec>
    </time>
    <speed>4.444800</speed>  ←                 SPEED AT TIME OF
    <direction>254.500000</direction>          IMAGE PICKUP
  </file>
  -<file name="Cap0002.jpg">                    DIRECTION AT TIME OF
    -<position>                                 IMAGE PICKUP
      -<latitude>
        <NS>N</NS>
        <deg>35</deg>
        <min>7</min>
        <sec>13.668000</sec>
      </latitude>
      -<longitude>
```

FIG. 29
(a) ORDINARY IMAGE AFTER DEVELOPMENT
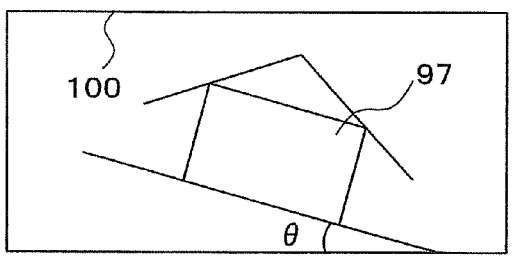
(b) IMAGE OBTAINED AS RESULT OF CORRECTION
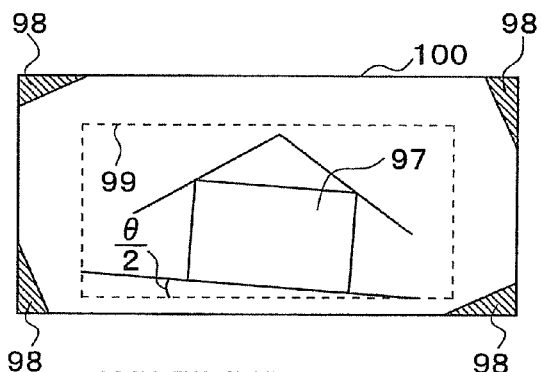
· DRAW IMAGE WITH
  INCLINATION CORRECTED
  BY $\theta/2$
· NARROW SCOPE OF DISPLAY
  TO REDUCE LOSS OF IMAGE
  PRODUCED DUE TO CORRECTION

IMAGE SERVER, IMAGE DELIVER BASED ON IMAGE INFORMATION AND CONDITION, AND IMAGE DISPLAY TERMINAL

CROSS REFERENCE TO RELATED APPLICATION

This application is a divisional of U.S. patent application Ser. No. 11/294,882 filed on Dec. 6, 2005 which is a continuation of an international patent application No. PCT/JP2004/008112 filed on Jun. 10, 2004 designating the United States of America, and is based on Japanese Patent Application No. 2003-167806 filed on Jun. 12, 2003, the contents of which are incorporated herein by reference in its entirety.

FIELD OF THE INVENTION

The present invention relates an image acquisition device that picks up the image of the surroundings of a vehicle, an image server that delivers images picked up, and an image display terminal that displays the images delivered by the image server.

BACKGROUND OF THE INVENTION

There are known services for transmitting the information about traffic jams and the like to remote persons. In such services, stationary cameras are installed on roadsides, and the images of roads picked up by these cameras are delivered to persons who request them. For example, a service called MONET (registered trademark) is so designed that the information about road conditions is delivered as images to cellular phone users.

In this form of service, however, information about any point cannot be viewed. To cope with this, techniques for picking up the images of various locations and storing them in databases beforehand have been disclosed. (Refer to, for example, Japanese Unexamined Patent Publication No. 2002-236990 and the Specification of Japanese Patent No. 3019299.) Also, a technique for picking up the image of any point dozens of times and thereby updating a database has been proposed.

However, when there are a plurality of pieces of data of images picked up in a continuing district on different occasions in a database, a problem arises. Users who receive delivered images in the database and continuously view them can feel something is wrong because of differences in image pickup environments such as weather.

With the foregoing taken into account, the present invention is intended to efficiently acquire images or deliver images so that uncomfortable feeling given to users who view images picked up is lessened.

Another object of the present invention is to make it possible to smoothly view images acquired and delivered.

DISCLOSURE OF THE INVENTION

To achieve the above objects, an image server according to the present invention is so constructed that it is characterized in that: the image server comprises: a storing medium for storing a picked image of surroundings of a vehicle, picked up with a camera mounted on the vehicle, and image pickup information of the picked image; and a delivering means that causes the storing medium to store the inputted picked image and image pickup information of the picked image, and delivers a picked image stored on the storing medium to an image display terminal that displays a received picked image. The image pickup information includes information about an image pickup point at which the picked image was picked up. The delivering means causes the storing medium to store one selected from among the inputted picked images with respect to each of segments of zones to which the image pickup points of these picked images belong based on the image pickup information and a predetermined selection condition.

Thus, picked images are selected on the predetermined condition and stored on a segment-by-segment basis. Therefore, the stored picked images are homogeneous from one segment to another. As a result, images can be efficiently acquired so that uncomfortable feeling given to users who view images picked up is lessened.

The image pickup information of a picked image may be created in a vehicle on which the picked image is picked up or may be created by others. An example will be taken with respect to weather under which images are picked up. Information about the presence/absence of rainfall or the like can be acquired from wiper information created in the vehicle. However, when detailed weather information is automatically acquired from any other weather server, more homogenous information can be provided.

The above-mentioned image server may be so constructed that the following is implemented: image pickup information includes information about the direction in which the vehicle is running when the picked image is picked up. The delivering means causes the storing medium to store one of inputted picked images selected based on the image pickup information and a predetermined selection condition with respect to each of the segments of zones to which the image pickup points of the picked images belong and of combinations of frontward directions and backward directions in which the vehicle is running when images are picked up.

The image server may be so constructed that the following is implemented: it comprises a storing medium for storing a picked image of surroundings of a vehicle, picked up with a camera mounted on the vehicle, and image pickup information of the picked image; and a delivering means that delivers a picked image stored on the storing medium to an image display terminal. The image pickup information includes information about an image pickup point at which the picked image was picked up. The delivering means delivers to the image display terminal one selected from among the picked images stored on the storing medium with respect to each of segments of zones to which the image pickup points of those picked images belong based on the image pickup information and a predetermined selection condition.

Thus, picked images are selected on the predetermined condition and delivered on a segment-by-segment basis. Therefore, the delivered picked images are homogeneous from one segment to another. As a result, images can be efficiently delivered so that uncomfortable feeling given to users who view images picked up is lessened.

The above-mentioned image server may be so constructed that the following is implemented: image pickup information includes information about the direction in which the vehicle is running when the picked image is picked up. The delivering means delivers to image display terminals one of the picked images stored on the storing medium, selected based on the image pickup information and a predetermined selection condition with respect to each of the segments of zones to which the image pickup points of the picked images belong and of combinations of frontward directions and backward directions in which the vehicle is running when images are picked up.

The image pickup information may include information about the image pickup time at which the picked image is picked up. The selection condition may be such that a picked image whose image pickup time is latest in the segment should be preferentially selected.

The image pickup information may include information about the running speed at which the vehicle is running when the picked image is picked up. The selection condition may be such that a picked image picked up when the running speed of the vehicle was slowest in the segment should be preferentially selected.

The image pickup information may include information about the weather under which the image pickup point is when the picked image is picked up. The selection condition may be such that a picked image picked up when the point was under nice weather in the segment should be preferentially selected.

The image pickup information may include information about the inclination at which the vehicle is when the picked image is picked up. The selection condition may be such that a picked image picked up when the vehicle was at the smallest angle of inclination in the segment should be preferentially selected.

The image pickup information may include information indicating whether the vehicle is in an intersection when the picked image is picked up or not. The selection condition may be such that a picked image picked up when the vehicle was in an intersection in the segment should be preferentially selected.

When the above-mentioned image server is provided with a storing medium for storing map information, the following is implemented: based on map information and image pickup information, the delivering means can determine whether the vehicle was in an intersection when the picked image was picked up. Therefore, the following selection condition can be adopted: a picked image picked up when the vehicle was in an intersection in the segment should be preferentially selected. The above-mentioned image server may be so constructed that the following is implemented: inputted picked images are omnidirectional images or images obtained by developing omnidirectional images. The delivering means slides the position of the display of a developed image so that the developed image is brought into a predetermined orientation.

An in-vehicle image acquisition device according to the present invention comprises: an image pickup means that picks up an image of surroundings of a vehicle; a present point identifying means that identifies a point at which the vehicle is presently positioned; an amount of inclination identifying means that identifies an amount of inclination of the vehicle relative to a horizontal plane; and a storing medium that stores picked images picked up by the image pickup means, information about the present point at which the vehicle is positioned when a picked image is picked up, and information about the inclination of the vehicle when an image is picked up for the purpose of providing them to the above-mentioned image server.

Thus, the in-vehicle image acquisition device can transmit information about the inclination of the vehicle to the image server; therefore, the image server can select a picked image based on the inclination. As a result, the in-vehicle image acquisition device can efficiently acquire images so that uncomfortable feeling given to users who view images picked up is lessened.

The in-vehicle image acquisition device may be constructed so that it comprises: an image pickup means that picks up an image of surroundings of a vehicle; a present point identifying means that identifies a point at which the vehicle is presently positioned; an intersection determining means that determines whether the vehicle is in an intersection or not; and a storing medium that stores picked images picked up by the image pickup means, information about the present point at which the vehicle is positioned when a picked image is picked up, and information indicating whether the vehicle was in an intersection when an image was picked up for the purpose of providing them to the above-mentioned image server.

Thus, the in-vehicle image acquisition device can transmit information indicating whether the vehicle is in an intersection or not to the image server; therefore, the image server can select a picked image based on the information indicating whether the vehicle is in an intersection or not. As a result, the in-vehicle image acquisition device can efficiently acquire images so that uncomfortable feeling given to users who view images picked up is lessened.

The in-vehicle image acquisition device may be so constructed that it comprises: an image pickup means that picks up an image of surroundings of a vehicle; a present point identifying means that identifies a point at which the vehicle is presently positioned; a running speed identifying means that identifies a running speed of the vehicle; and a storing medium that stores picked images picked up by the image pickup means, and information about the present point at which the vehicle is positioned when a picked image is picked up for the purpose of providing them to the above-mentioned image server. The image pickup means determines the time interval at which images are repeatedly picked up based on the running speed of the vehicle.

Thus, picked images can be acquired at a time interval for image pickup corresponding to the running speed; therefore, the in-vehicle image acquisition device can effectively acquire images so that uncomfortable feeling given to users who view images picked up is lessened.

The in-vehicle image acquisition device may be so constructed that it comprises: an image pickup means that picks up an image of surroundings of a vehicle; a present point identifying means that identifies a point at which the vehicle is presently positioned; and a storing medium that stores picked images picked up by the image pickup means and information about a present point at which the vehicle is positioned when a picked image is picked up for the purpose of providing them to the above-mentioned image server. The image pickup means picks up the image of a pre-specified key point in more detail than usual.

Thus, the image of a pre-specified key point can be picked up in more detail than usual; therefore, the in-vehicle image acquisition device can effectively acquire images so that uncomfortable feeling given to users who view images picked up is lessened.

It is preferable that an image server according to the present invention should be constructed that the following is implemented: it is assumed that image pickup information includes information about an image pickup point identified by a GPS sensor mounted in a vehicle on which the picked image is picked up. When the information about the image pickup point is deemed not to have been correctly identified by the GPS sensor, the delivering means corrects the information about the image pickup point.

Thus, when the GPS sensor does not properly operate, the resulting information can be corrected; therefore, the image server can effectively acquire and deliver images so that uncomfortable feeling given to users who view images picked up is lessened. The information about image pickup points can be corrected using map matching.

An image display terminal according to the present invention is characterized in that it comprises: a receiving means that receives picked images and image pickup information delivered by an image server that delivers the picked image of surroundings of a vehicle, picked up by a camera mounted on the vehicle, and the image pickup information of the picked image; and a display controlling means that causes a displaying means to display the received picked image. The image pickup information includes information about an image pickup point at which the picked image is picked up. The display controlling means carries out the following when it receives an instruction to advance an image in some direction: the display controlling means searches picked images picked up in a search region that is within a predetermined direction range including that direction and in which the distance from the point at which the picked image presently displayed on the displaying means was picked up is within a predetermined range. The display controlling means selects the picked image to be displayed next on the displaying means from among the found picked images in accordance with a predetermined selection rule.

Thus, when images are continuously displayed based on picked images and image pickup information delivered by the image server, the user can smoothly view the picked images.

With respect to the above-mentioned image display terminal, the selection rule may be such that the picked image picked up at the latest image pickup time in the search region should be preferentially selected.

The selection rule may be such that the picked image picked up when the running speed of the vehicle was lowest in the search region should be preferentially selected.

With respect to the above-mentioned image display terminal, the image pickup information may include information about the image pickup time at which the picked image is picked up. The selection condition may be such that the picked image whose image pickup time is closest to that of the picked image presently displayed on the displaying means in the segment should be preferentially selected.

When the result of search revels that there is no picked image picked up in the search region, the display controlling means may cause the displaying means to display an indication that traveling is impossible at the above-mentioned image display terminal.

The display controlling means may be so constructed that the following is implemented: with respect to each of a plurality of directions, picked images picked up in a search region that is within the direction range of that direction and in which the distance from the point at which the picked image displayed by the displaying means was picked up is within a predetermined range are searched. When the result of search reveals that there is any picked image picked up in the search region, the displaying means is caused to display an indication that the vehicle can travel in that direction, together with the picked image.

The above-mentioned direction refers to the direction of forward travel. The following constitution may be adopted: the image pickup information includes information about the direction in which the vehicle was running when the picked image was picked up. The display controlling means is so constructed that the following is implemented: based on the relation between the direction in which the vehicle was running when the picked image displayed next by the displaying means was picked up and the direction of the present forward travel, the picked image is displayed with the running direction or the direction opposite thereto taken as the direction of the next forward travel.

The following constitution may be adopted: the image pickup information includes information about the inclination at which the vehicle was when the picked image was picked up. Based on the information about inclination, the display controlling means corrects the picked image so that the leaning of the buildings in the picked image is reduced. Then the display controlling means causes the displaying means to display the corrected picked image.

Thus, when a picked image and the information about inclination delivered from the image server are displayed, the user can smoothly view the picked image.

In this case, it is preferable that the displaying means should narrow the scope of display of corrected picked images so that loss of image information is reduced in displayed corrected picked images.

BRIEF DESCRIPTION OF THE DRAWINGS

In the drawing:

FIG. 3 is a drawing illustrating an example of the image pickup information of an image created by an information processing unit 13;

FIG. 29 is a schematic diagram illustrating correction processing based on the inclination of the vehicle 1;

PREFERRED EMBODIMENTS OF THE INVENTION

First Embodiment

Figure 1:
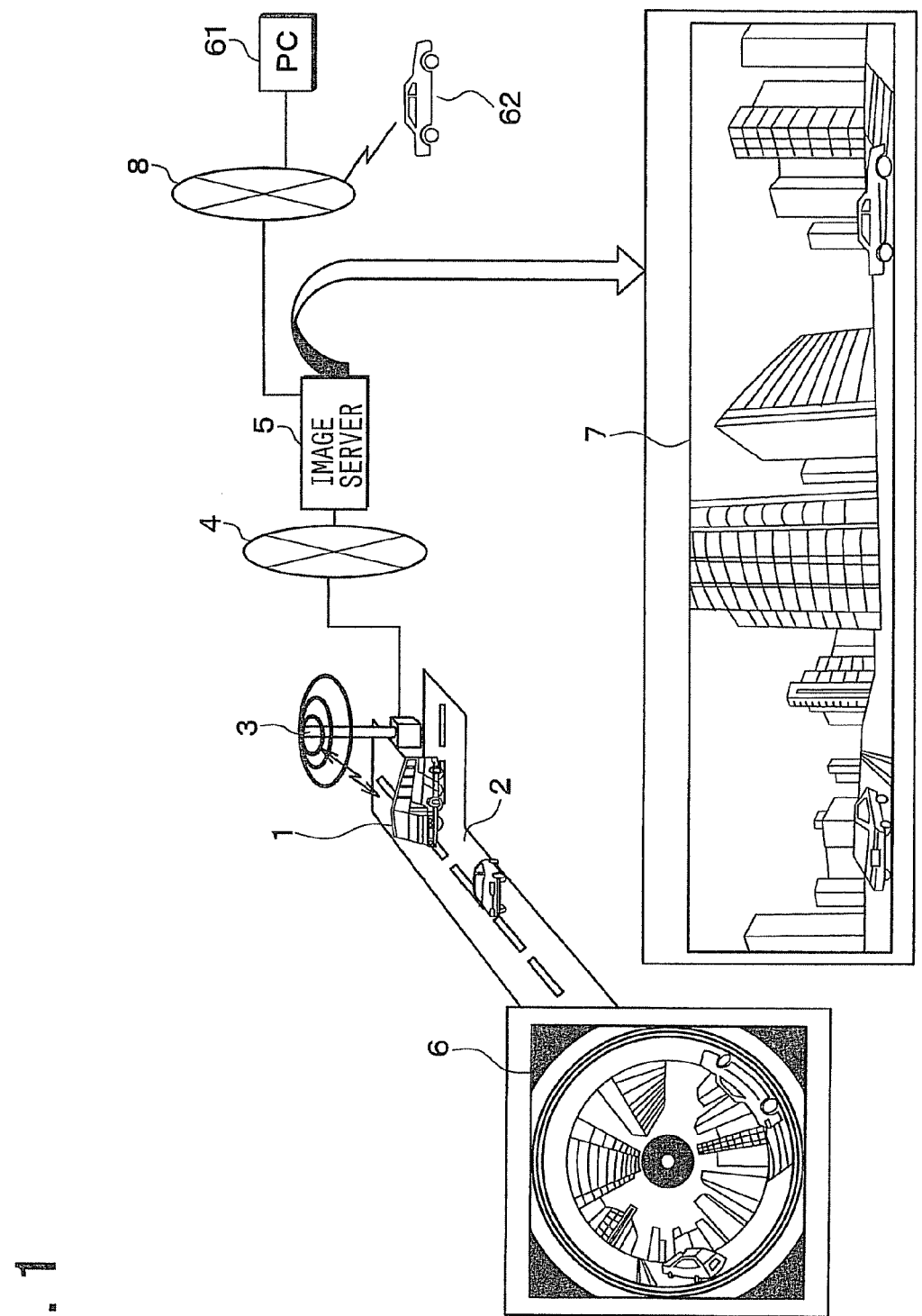
FIG. 1 is a conceptual diagram schematically illustrating an image delivery system in a first embodiment of the present invention.

FIG. 1 is a conceptual diagram schematically illustrating an image delivery system in a first embodiment of the present invention. A vehicle 1 (probe car) running on a road 2 is provided with an omnidirectional image pickup function that allows the image of the 360 degree surroundings of the vehicle itself to be picked up, and with a communication function for wireless communication with base stations 3. The vehicle 1 transmits a picked image 6 picked up by the omnidirectional image pickup function and the image pickup information of the picked image 6 to an image server 5 through a base station 3 and a base station network 4 to which the base station 3 is connected. The image pickup information includes: the position in which the vehicle was when the picked image 6 was picked up; image pickup time, the direction (azimuth) in which the vehicle was running when the image was picked up; the running speed at which the vehicle 1 was when the image was picked up; and the like. The image pickup information of an image refers to information about the circumstances under when the image is picked up. The picked image 6 is an image of surroundings in all the azimuths viewed from the vehicle 1, like those viewed through a fisheye lens. In this image, actual scenery is distorted, and the image is very difficult for humans to recognize.

Place of image pickup is a concept including both the position in which the vehicle 1 was when a picked image 6 was picked up and the position in which the object of image pickup was when the picked image 6 was picked up. For example, the position of an object of image pickup may be the road 2 immediately in front of the vehicle 1 or may be long-distance scenery directly viewed over the road 2.

On reception of the picked image 6 and the image pickup information of the picked image 6, the image server 5 delivers a delivered image 7 and the image pickup information of the delivered image 7. These items are delivered to a personal computer 61 or an in-vehicle machine 62 that connects to the image server 5 through a wide area network 8 to which the image server 5 is connected, and requests delivery of images. At this time, the image server 5 includes the information about the position of object of image pickup in the image pickup information if necessary. The delivered image 7 is a developed image obtained by correcting the distortion in the picked image 6 so that the image is easy for humans to view.

The vehicle 1 receives an order of timing with which an image is picked up, from the image server 5 by wireless communication, and picks up an image with the specified timing. In this embodiment, timing of image pickup refers to a position in which the vehicle 1 is when an image is picked up. The meaning of picking up an image when the vehicle 1 comes to some position is the same as that of picking up an image at a time when the vehicle 1 comes to some position.

Figure 2:
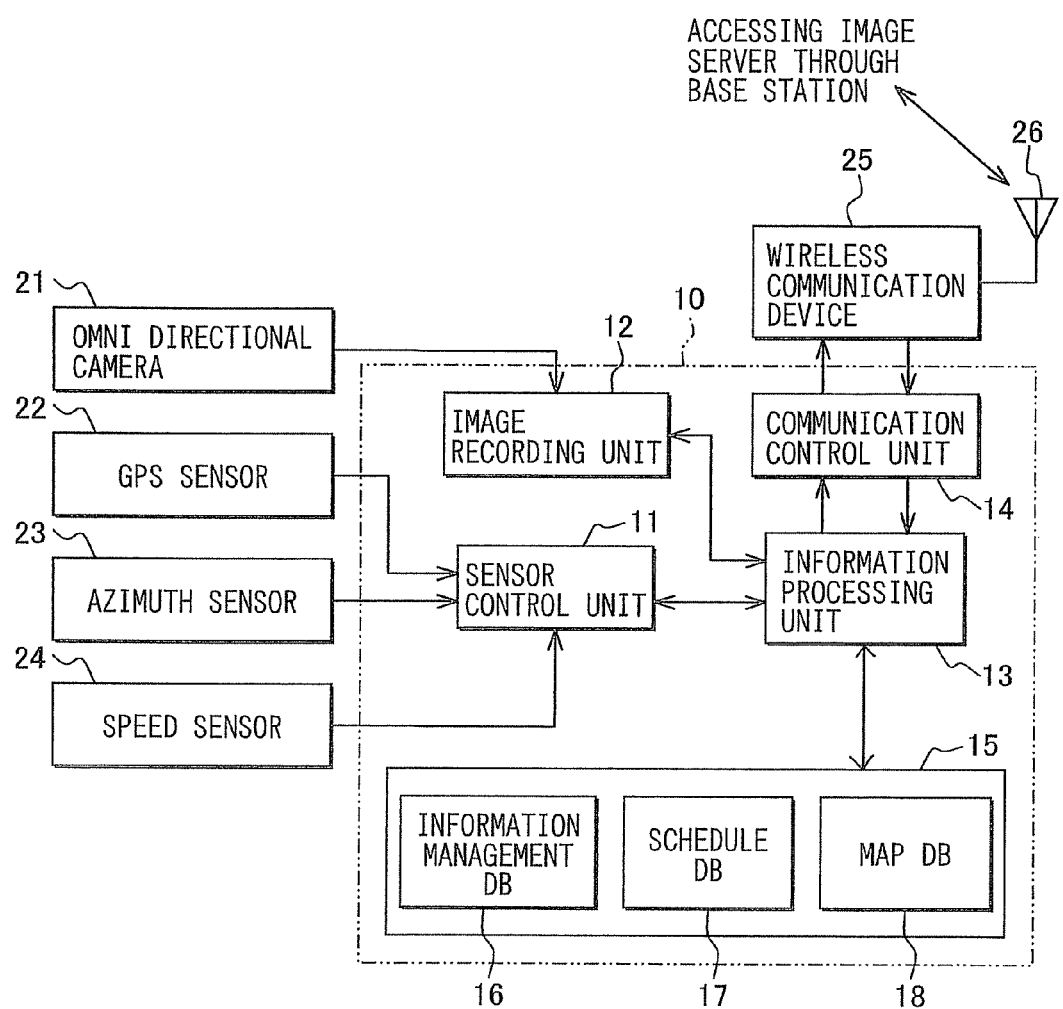
FIG. 2 is a block diagram illustrating the configuration of devices, mounted in a vehicle 1, for picking up images and transmitting them to an image server 5.

FIG. 2 is a block diagram illustrating the configuration of devices, mounted in a vehicle 1, for picking up images and transmitting them to an image server 5.

These devices in the vehicle 1 include an image control computer (or a computer for image acquisition) 10, an omnidirectional camera 21, a GPS sensor 22, an azimuth sensor 23, a speed sensor 24, a wireless communication device 25, and an antenna 26.

The omnidirectional camera 21 receives the omnidirectional image of the scenery of 360 degree surroundings at a time, and continuously outputs the received omnidirectional video pictures. For this camera, an omnidirectional camera disclosed in the specification of Japanese Patent No. 2939087 can be used.

The GPS sensor 22 receives information from GPS satellites, computes the current position, running speed, and running direction of the vehicle 1, and outputs them as current position information. The GPS sensor 22 also outputs information indicating whether current position information can be outputted or not.

The azimuth sensor 23 is a device that detects the present orientation, east, west, south, north, or the like, of the vehicle 1 using a gyroscope, and outputs it as direction information.

The speed sensor 24 detects the number of rotations of a tire of the vehicle 1, computes the running speed of the vehicle 1 from this number of rotations and an elapsed time, and outputs it as speed information.

The wireless communication device 25 converts communication data into a radio signal, and transmits this radio signal from the antenna 26 to base stations supporting the communication system of the wireless communication device 25. Examples of the communication system of the wireless communication device 25 include PDC, wireless LAN, and the like.

The image control computer 10 comprises a sensor control unit 11, an image recording unit 12, an information processing unit 13, and a communication control unit 14.

The sensor control unit 11 receives the current position information, direction information, and speed information with respect to the vehicle 1 respectively from the GPS sensor 22, azimuth sensor 23, and speed sensor 24, and outputs these received pieces of information to the information processing unit 13. The sensor control unit 11 receives and outputs these pieces of information periodically, for example, every one second in the case of this embodiment. Information is also received and outputted by receiving a control signal requesting these pieces of information from the information processing unit 13.

The image recording unit 12 receives omnidirectional video pictures from the omnidirectional camera 21, and records them as omnidirectional images and simultaneously outputs them to the information processing unit 13. The image recording unit 12 is so constructed that when it is receiving a control signal for image recording from the information processing unit 13, it records omnidirectional video pictures, received from omnidirectional camera 21, as images.

The information processing unit 13 receives a specification of the position in which the vehicle 1 is when an image is picked up from the communication control unit 14, and it stores the specified information in a memory 15 as a mass-storage device such as HDD (Hard Disk Drive). The areas for an information management DB (DataBase) 16, a schedule DB 17, and a map DB 18 are ensured in the memory 15.

The information management DB 16 stores images recorded in the image recording unit 12 by the information processing unit 13 and the image pickup information, described later, associated with the images. The schedule DB 17 stores information about image pickup schedules including the timing of image pickup, image pickup positions, and the like, such as specifications of a position in which the vehicle is when an image is picked up. The image pickup schedule may be predetermined. The map DB 18 stores map data for map matching, described later, and map display.

The information processing unit 13 performs the following operation: it periodically receives current position information, which originates in the GPS sensor 22, from the sensor control unit 11; it reads specified information, stored in the schedule DB 17, from the memory 15, and compares the current position of the vehicle 1 with a specified position. When the vehicle 1 arrives at the specified position, the information processing unit 13 outputs a control signal for image recording to the image recording unit 12, and receives an image from the image recording unit 12. This image is picked up by the omnidirectional camera 21.

The information processing unit 13 performs the following operation: at the time of the above-mentioned image pickup, it outputs a control signal to the sensor control unit 11, requesting current position information, direction information, and speed information. The information processing unit 13 receives these pieces of information outputted by the sensor control unit 11 according to this control signal. The information processing unit 13 creates the image pickup information, including the time at which the image was picked up, current position information, direction information, and speed information, from these received pieces of information, and stores it in the information management DB 16.

FIG. 3 illustrates an example of the image pickup information of an image created by the information processing unit 13. This created information is described in the XML format, and comprises tags that are character strings indicating the attributes of bracketed data and data whose attributes are specified by tags. The value of name parameter in <file> tag, "cap0001.jpg" indicates the file name of the corresponding image.

Between <position> and </position>, current position information comprising the longitude indicated between <longitude> and </longitude> and the latitude indicated between <latitude> and </latitude> is placed. Map code may be included in the current position information. In the example illustrated in FIG. 3, current position information obtained when the image was picked up is 137° 4'41.981998" east longitude and 35° 7'13.692000" north latitude.

Between <time> and </time>, time information comprising the date indicated between <date> and </date> and the local time indicated between <localtime> and </localtime> is placed. In the example illustrated in FIG. 3, the time at which the image was picked up is 10 o'clock 44 minutes 46 seconds, Mar. 1, 2002.

Between <speed> and </speed>, speed information is indicated. In the example illustrated in FIG. 3, the speed at which the vehicle 1 was running when the image was picked up is 4.444800 km/h.

Between <direction> and </direction>, information about the orientation of the vehicle is indicated in azimuth angle. In the example illustrated in FIG. 3, the center of the image picked up is at 254.500000° from the north.

The information processing unit 13 transmits an image picked up and the image pickup information of this image as communication data to the communication control unit 14. The information processing unit 13 includes, in this communication data, information that instructs the communication control unit 14 to transmit this communication data through the wireless communication device 25.

The communication control unit 14 is a device that controls the wireless communication device 25 to connect it to base stations and base station networks so as to carry out data communication with the image server 5. The communication control unit 14 transmits communication data to the image server 5 by this data communication. The communication data includes images received from the information processing unit 13 for the purpose of wireless transmission and the image pickup information of the images.

The communication control unit 14 performs the following operation: it receives communication data converted from radio signals that originate in the image server 5, received from a base station by the wireless communication device 25, and outputs it to the information processing unit 13. An example of the radio signals that originate in the image server 5 is a radio signal for specifying the timing with which the image control computer 10 picks up an image.

Figure 4:
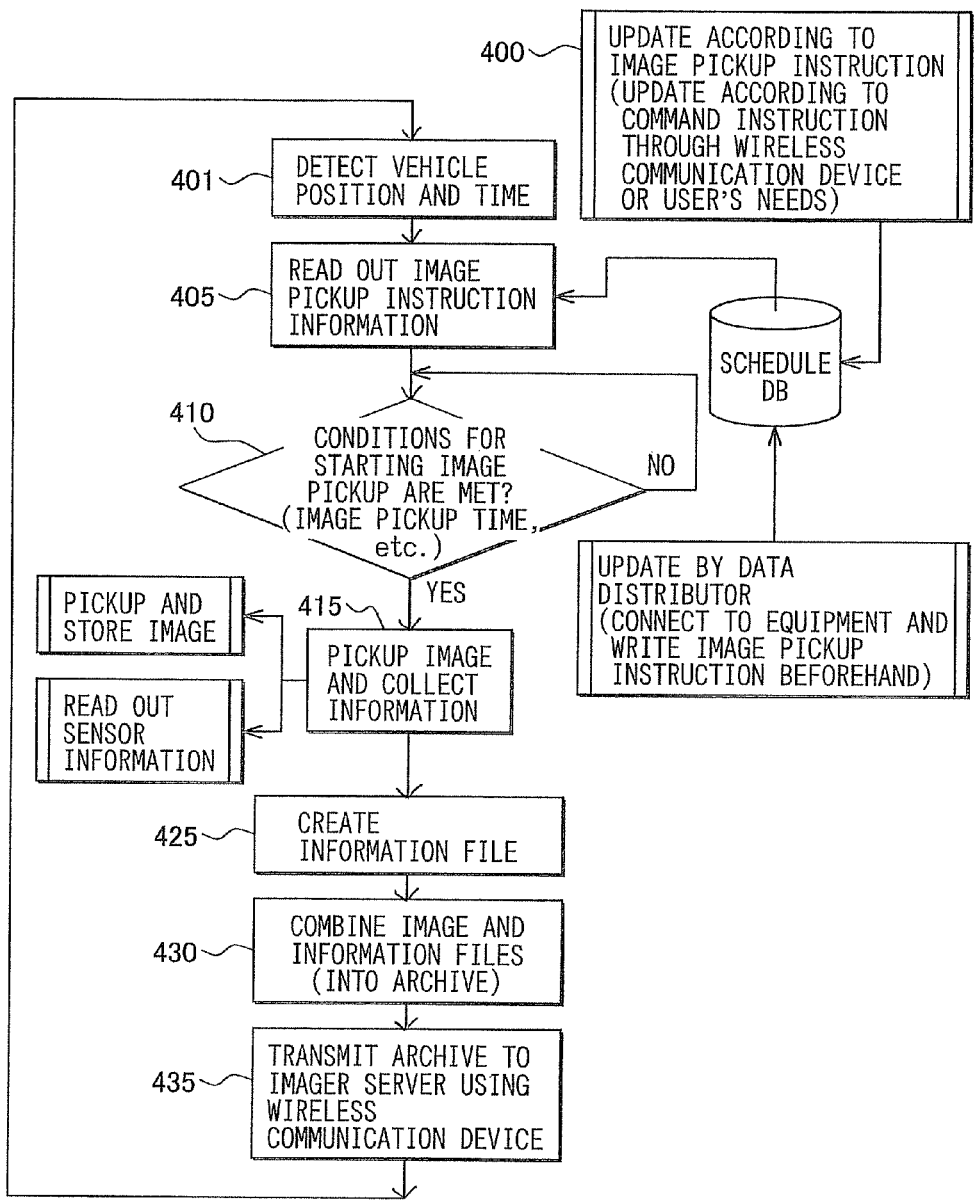
FIG. 4 is a flowchart of the processing carried out when the information processing unit 13 picks up an image and transmits it to the image server 5.

FIG. 4 is a flowchart illustrating the processing carried out by the thus constructed information processing unit 13 of the vehicle 1 to pick up an image with the omnidirectional camera 21 and transmit the image to the image server 5. Hereafter, specific description will be given to the operation of the information processing unit 13 with reference to this flowchart. Prior to this processing, the information processing unit 13 receives from the communication control unit 14 an order of the position in which the vehicle 1 should be when an image is picked up, originating in the image server 5 and stores it in the memory 15 (Step 400).

When the vehicle 1 is running in this state, the vehicle 1 carries out periodical processing, that is, acquires current position information that originates in the GPS sensor 22 from the sensor control unit 11 (Step 401). The information processing unit 13 reads the specified information stored in the schedule DB 17 from the memory 15 (Step 405).

At Step 410, the information processing unit 13 compares the current position of the vehicle 1 acquired at Step 401 with the specified image pickup position acquired at Step 405. The information processing unit 13 determines whether the vehicle 1 has come close to a point at a specified distance from the specified position, and thereby determines whether to start image pickup with the omnidirectional camera 21. When there is any order of an image pickup time in the memory, the information processing unit determines whether it has come to a point of time a specified time period before the specified image pickup time, and thereby determines whether to start image pickup with the omnidirectional camera 21. This determination processing is repeated until it determines that image pickup should be started.

When the information processing unit 13 determines that image pickup should be started, it starts image pickup with the omnidirectional camera 21. At this time, it receives current position information, direction information, speed information, and the like from the sensor control unit 11 (Step 415).

When image pickup is completed, the information processing unit 13 creates the image pickup information from the current position information, direction information, speed information, and the like received from the sensor control unit 11 with respect to the vehicle 1 (Step 425). The information processing unit combines the image picked up and the image pickup information into an archive (Step 430). It creates communication data from the archive to be sent out to the image server 5 through the wireless communication device 25, and transmits this communication data to the communication control unit 14 (Step 435). Then the processing returns to Step 401.

In the above description, an image and the image pickup information are transmitted to the communication control unit 14 each time the image is picked up. Instead, these items may be transmitted to the communication control unit 14 only when the amount of images reaches a predetermined amount.

By the above-mentioned processing, images picked up at the vehicle 1 according to orders from the image server 5 or the setting made at the time of installation are transmitted to the image server 5.

Figure 5:
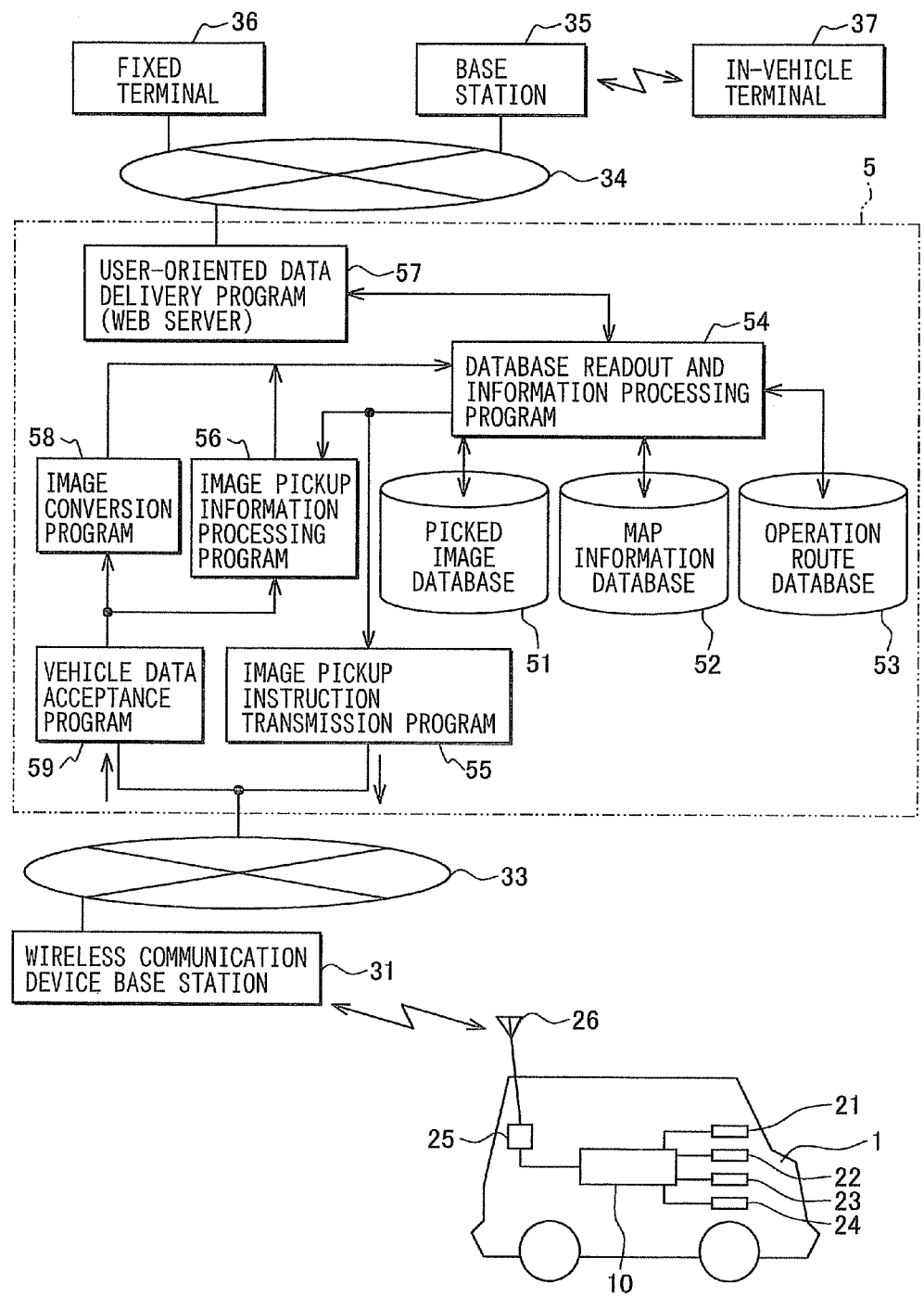
FIG. 5 is a block diagram illustrating the configuration of the image delivery system including the devices in the vehicle 1.

FIG. 5 is a block diagram illustrating the configuration of the image delivery system including the above-mentioned devices in the vehicle 1. The image delivery system comprises: a wireless communication device base station 31 that communicates with the antenna 26 of the vehicle 1; a base station network 33 that is a wired network in which the base station participates; the image server 5 connected with the base station network 33; a base station 35 and a fixed terminal 36 connected with the image server 5 through a base station network 34; and an in-vehicle terminal 37 that wirelessly communicates with the base station 35.

The fixed terminal 36 is a terminal installed in an office or a home. This terminal can request and receive images and the image pickup information of the images from the image server 5 through the base station network 34 and can perform other like operations.

The in-vehicle terminal 37 is a terminal installed in an automobile. This terminal can request and receive images and the image pickup information from the image server 5 through the base station 35 and the base station network 34 and can perform other like operations.

The image server 5 is a device that receives images and the image pickup information from the vehicle 1 through the base station network 33 and the wireless communication device base station 31 and stores them. The image server 5 communicates with the fixed terminal 36 through the base station network 34 and with the in-vehicle terminal 37 through the base station network 34 and the base station 35. The image server 5 receives inquiries about lists of stored images and image pickup information from the fixed terminal 36 and the in-vehicle terminal 37, and sends the lists back to the fixed terminal 36 and the in-vehicle terminal 37 based thereon. Also, the image server 5 receives from the fixed terminal 36 or the in-vehicle terminal 37 signals requesting deliveries of images picked up in specified places of image pickup and the image pickup information.

According to these requests, the image server 5 delivers images and the image pickup information including information about points of image pickup.

The image server 5 has a processor (not shown) for performing the above-mentioned processing, and executes programs having various functions with this processor. These programs are executed in parallel and data is passed between them.

The image server 5 performs the following operation with respect to each of segments, or areas: when a plurality of pieces of image data acquired from the vehicle 1 or the like, obtained by picking up images in an area, the image server selects and stores only appropriate ones, and delivers them. Area refers to a zone obtained by segmenting a geographical district.

The image server 5 is provided with a mass-storage device (not shown) having databases in which information used for the above-mentioned processing is recorded. Specifically, the image server is provided with HDD having a picked image database 51, a map information database 52, and an operation route database 53.

The picked image database 51 records images and the image pickup information received from vehicles. The images and the image pickup information are systematically arranged and stored by image pickup time at which the images were picked up or place of image pickup in which the images were picked up. However, the images recorded in the picked image database 51 are developed from picked image 6 to delivered image 7 by the processing described later.

The map information database 52 records map information including place names, the positions of roads and the shapes of lanes, and building information. Building information is information specific to each building, including the name of the building, including parking lot name and store names, the name, phone number, and e-mail address of building owner, the address of a web site associated with the building, the location code of the building, the advertisement and catch copy for the building, and the like.

The operation route database 53 records the operation schedule for vehicles that run on predetermined routes according to predetermined timetables and are provided with image pickup and transmission functions as the vehicle 1 is, which operation schedule correlates time with running position. Examples of such vehicles include routine-run route buses, routine-run delivery trucks of freight companies, and the like. When vehicles whose operation schedule is established are used to pick up images, the schedules provide a criterion for selecting a vehicle that should be caused to pick up a requested image. Thus, images can be efficiently picked up and delivered.

The above-mentioned programs utilize these databases. The image server 5 is provided with various programs that are loaded and executed by the processor of the image server 5. Such programs include: a database readout and information processing program 54, an image pickup instruction transmission program 55, an image pickup information processing program 56, a user-oriented data delivery program 57, an image conversion program 58, and a vehicle data acceptance program 59.

Figure 6:
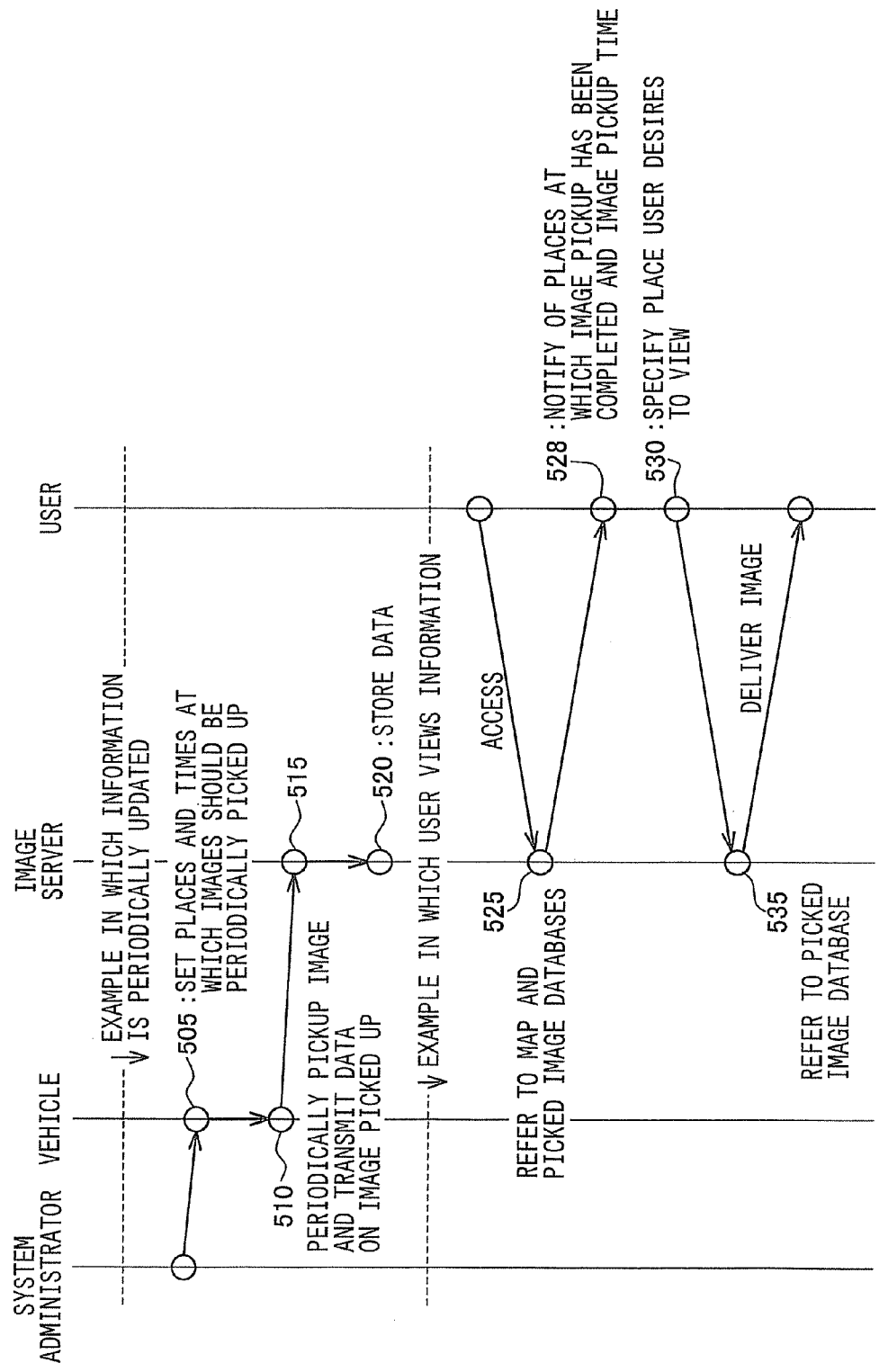
FIG. 6 is a timing chart illustrating the timing of communication between the image server 5, the vehicle 1, a fixed terminal 36, and an in-vehicle terminal 37.

FIG. 6 is a timing chart illustrating the following processing carried out in such an image delivery system based on the communication between the image server 5, the vehicle 1, and the fixed terminal 36 and in-vehicle terminal 37: the image server 5 stores an image and the image pickup information received from the vehicle 1, and delivers them in response to a request to deliver the image and the image pickup information from the fixed terminal 36 and the in-vehicle terminal 37.

Hereafter, description will be given to the operations of these programs in the order of the following processing: the image server 5 receives a request to deliver an image and the image pickup information from the fixed terminal 36 or the in-vehicle terminal 37; and it delivers the image and the image pickup information in response to the request. Thus, the operations of the individual programs and the entire image server 5 will be clarified.

When the vehicle 1 is equipped with the devices for picking up images and transmitting images picked up and the image pickup information to the image server 5, the system administrator and the like make setting with respect to places and times at which images should be periodically picked up (Step 505). This setting is made by recording specified places and times in the memory of the vehicle 1. According to this setting, the information processing unit 13 periodically picks up an image and transmits the image picked up and the image pickup information to the image server 5 through the wireless communication device base station 31 and the base station network 33 (Step 510).

The vehicle data acceptance program 59 of the image server 5 receives the transmitted image and image pickup information. When the vehicle data acceptance program 59 receives these items (Step 515), it transmits the received image to the image conversion program 58, and the received image pickup information to the image pickup information processing program 56.

Figure 7:
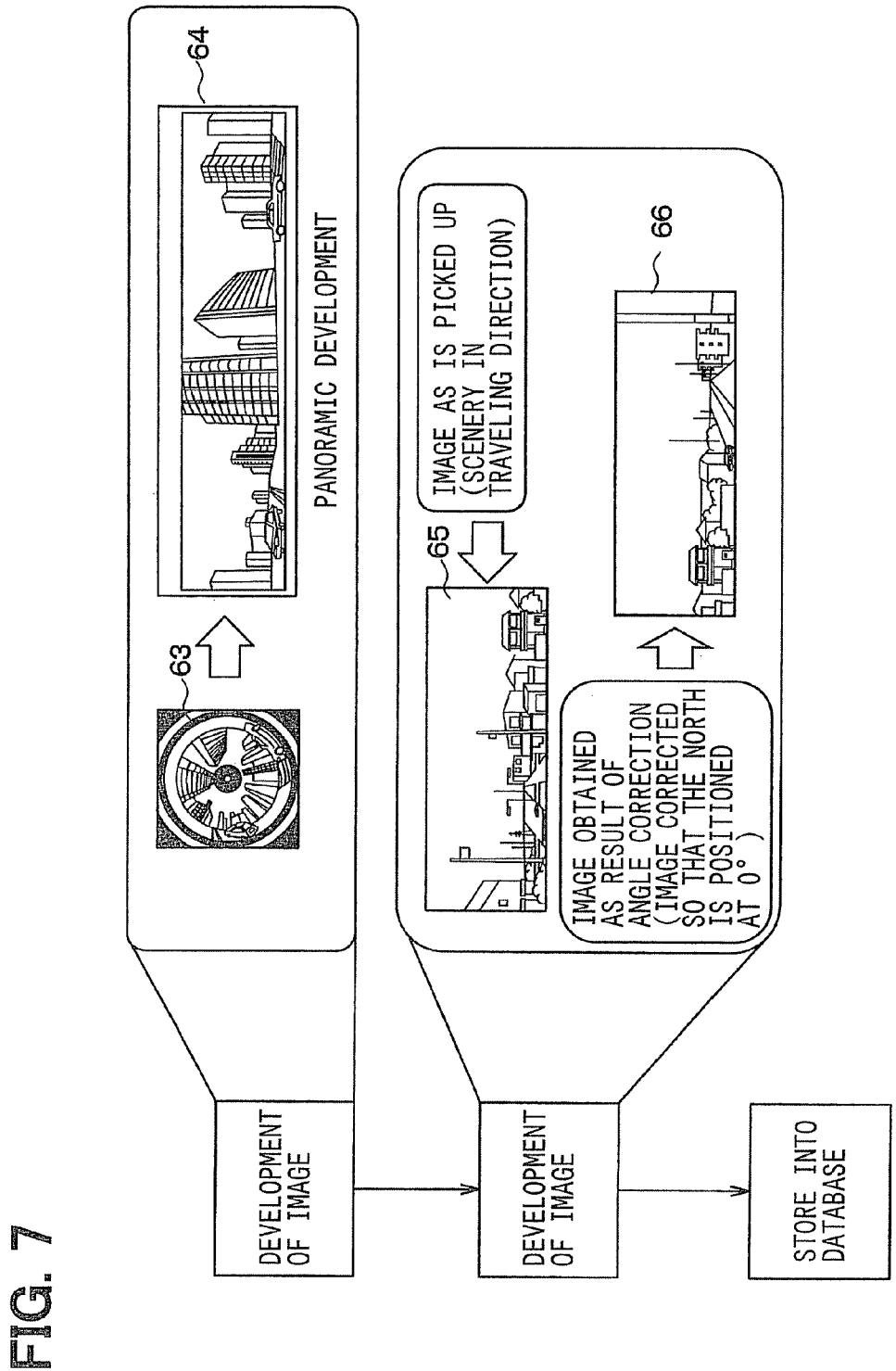
FIG. 7 is a conceptual diagram of processing carried out by the image conversion program 58 of the image server 5.

The image conversion program 58 is a program that receives the image from the vehicle data acceptance program 59, converts and corrects it, and transmits the converted image to the database readout and information processing program 54. FIG. 7 is a conceptual diagram illustrating the processing performed by the image conversion program 58. The image picked up by the information processing unit 13 and received by the vehicle data acceptance program 59 is an omnidirectional image like image 63 illustrated in FIG. 7. This omnidirectional image is an image in which the actual scenery is distorted as mentioned above, and thus difficult for humans to recognize and to handle. To cope with this, the omnidirectional image is converted into an image at the same screen ratio as the actual scenery like image 64 illustrated in FIG. 7.

This conversion is carried out so that the portion of the received image corresponding to the direction ahead of the vehicle comes to the center. Therefore, the azimuth of the center of the developed image 65 differs depending on the orientation in which the vehicle 1 was when the relevant image was picked up. Consequently, the image conversion program 58 acquires the image pickup information of the relevant image from the picked image database 51 or the image pickup information processing program 56 and corrects the image. This correction is carried out by sliding the displayed converted image with the disposition of the image unchanged so that the displayed image is oriented to the north, based on the orientation in which the vehicle 1 was when the relevant image was picked up. That is, processing is performed to unify the orientations of the images picked up when they are displayed. (This processing corresponds to conversion from image 65 to image 66.) The orientation of a displayed image refers to the bearing of the center of the displayed image.

The image pickup information processing program 56 receives the image pickup information from the vehicle data acceptance program 59, and subjects it to predetermined processing; it transmits information obtained as the result of the processing to the database readout and information processing program 54. The predetermined processing refers to conversion of image pickup information described in the XML format, for example, illustrated in FIG. 3, into such a format as data table.

The database readout and information processing program 54 receives the converted image from the image conversion program 58, and simultaneously receives the image pickup information, predeterminedly processed, from the image pickup information processing program 56. The database readout and information processing program 54 correlates the received image with the received image pickup information. It systematically arranges the image and the image pickup information by image pickup time or place of image pickup at which the image was picked up, and stores them in the picked image database 51. The image pickup time and place of image pickup of an image are determined by referring to the image pickup information.

Figure 8:
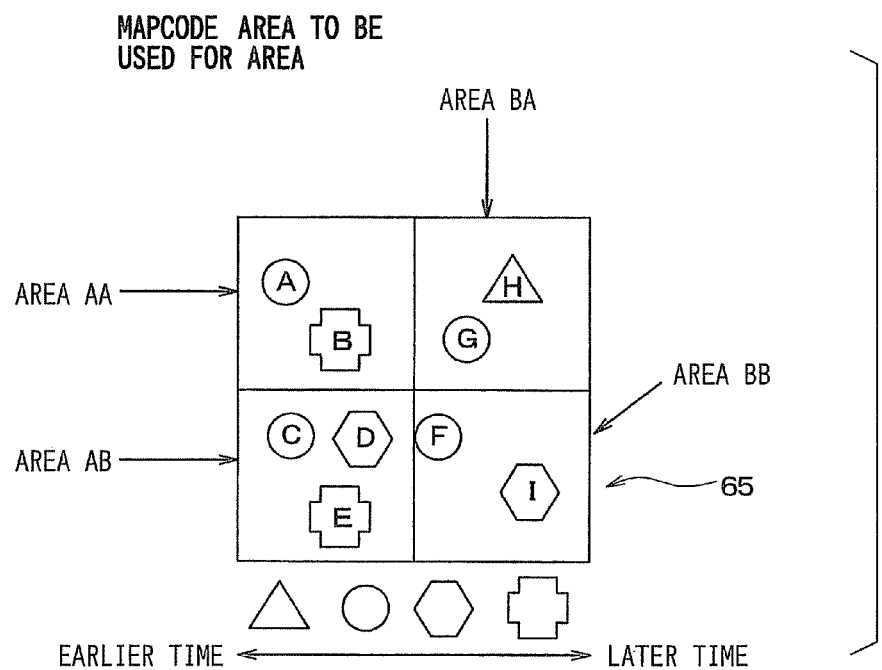
FIG. 8 is a conceptual diagram illustrating a method with which a database readout and information processing program 54 selects an image.

However, when there are a plurality of pieces of image data obtained by picking up images in one predetermined area (zone), acquired from the vehicle 1 or the like, the database readout and information processing program 54 performs the following operation: it selects an appropriate one from among these pieces of image data and stores it in the picked image database 51. FIG. 8 is a conceptual diagram illustrating this selecting method. In the example illustrated in FIG. 8, district 65 is segmented into minimum areas (areas AA, AB, BA, and BB) in Mapcode (registered trademark). The following case will be taken as an example: the position in which an acquired image B was picked up is area AA, and image A picked up also in area AA already exists in the picked image database 51. In this case, the time at which images were picked up is used for selection condition (hereafter, referred to as "filtering condition"). Of image A and image B, the image whose image pickup time is later is stored in the picked image database 51, and the other image is discarded.

Thus, only one image per area is stored using a filtering condition. As a result, images that are close to one another in image pickup time are delivered from the image server 5, and uncomfortable feeling is lessened when images are continuously displayed.

Various conditions can be used for the filtering condition. For example, the following conditions may be used: an image picked up when the speed of the vehicle 1 is low should be preferentially stored; and an image picked up when the inclination of the vehicle 1 is small should be preferentially stored. Compliance with the above-mentioned filtering conditions is determined using the image information of acquired images.

Figure 9:
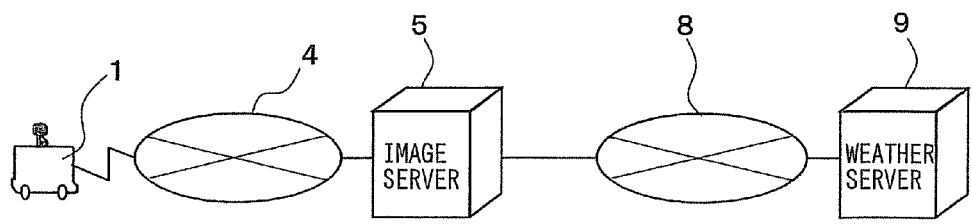
FIG. 9 is a drawing illustrating a weather server 9 that communicates with the image server 5.

The following condition may be used as another filtering condition: the image of a place that is under fine weather when the image is picked up should be preferentially stored. In this case, however, the constitution illustrated in FIG. 9 is adopted. More specific description will be given. A weather server 9 is connected with a wide area network 8 or the like, and delivers weather information associated with various places. Weather information for the place and the time at which the relevant image was picked up is acquired from the weather server 9, and this information is included in the image pickup information and stored in the picked image database 51.

Information indicating whether it is raining or not in the position of the vehicle 1 may be acquired as follows: the information processing unit 13 of the vehicle 1 can detect the actuation of a wiper (not shown). When the wiper is operating, the information processing unit determines that it is raining; when the wiper is not operating, the information processing unit determines that it is not raining. Information indicating the result of this determination is transmitted as image pickup information to the image server 5, together with an image picked up.

Even when the above-mentioned filtering condition is used, images are selected in individual areas under the same condition. Therefore, uncomfortable feeling is lessened when images are continuously displayed.

Figure 10:
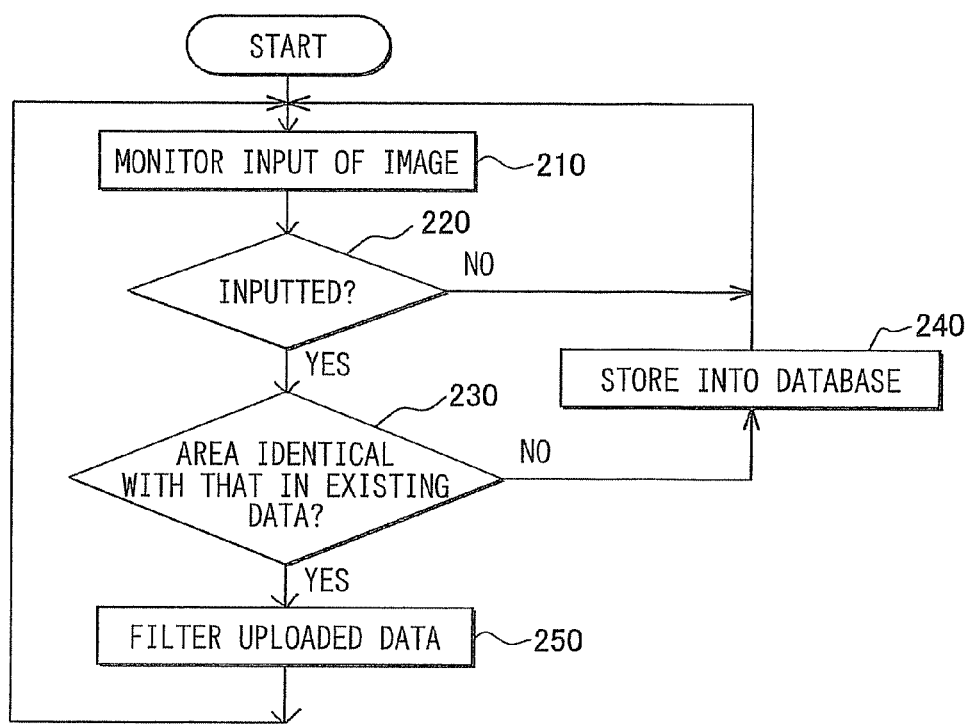
FIG. 10 is a flowchart illustrating the portion of processing carried out by the database readout and information processing program 54 in which a filtering condition is used.

FIG. 10 is a flowchart illustrating the portion of the processing performed by the database readout and information processing program 54 in which any of the above-mentioned filtering condition is used.

At Step 210, an input of a picked image from the image conversion program 58 is monitored. When it is determined at Step 220 that the result of monitoring at Step 210 reveals that there is an input, the processing proceeds to Step 230. When there is no input, the processing returns to Step 210.

At Step 230, with respect to the inputted image, the following is determined based on the image pickup information inputted from the image pickup information processing program 56: whether the area to which the image pickup point of that image belongs is identical with an area embracing the image pickup point included in existing image data, already present in the picked image database 51. When they are identical with each other, the processing proceeds to Step 250. When there is no identical area, the processing proceeds to Step 240.

At Step 240, the relevant image is stored in the picked image database 51, and the processing thereafter returns to Step 210. At Step 250, either of the relevant image and the image that is identical with the relevant image in the area in which the image pickup position is embraced is selected using the above-mentioned filtering condition. Only the selected image is stored in the picked image database 51. The processing returns to Step 210. Selection based on filtering condition is accomplished by the above-mentioned processing.

The database readout and information processing program 54 performs the following operation: when transmission of map information is requested by the image pickup information processing program 56, the database readout and information processing program 54 reads map information out of the operation route database 53. Then, it transmits the map information read out to the image pickup information processing program 56.

The vehicle data acceptance program 59, image pickup information processing program 56, image conversion program 58, and database readout and information processing program 54 perform the above-mentioned processing. As the result of this processing, the data received by the vehicle data acceptance program 59 at Step 515 is stored in the picked image database 51 (Step 520).

In the image server 5, images picked up and the image pickup information are stored in the picked image database 51, as mentioned above. When a user accesses the image server 5 through a network such as the base station network 34 for viewing an image, the following takes place: the user-oriented data delivery program 57 of the image server 5 requests the database readout and information processing program 54 to transmit a list of the images stored in the picked image database 51 and map information in the map information database 52.

When the database readout and information processing program 54 receives the request to transmit the list of images and the map information, it searches the picked image database 51 and creates this list. The database readout and information processing program 54 reads the map information out of the map information database 52, and transmits the created list and the map information read out to the user-oriented data delivery program 57.

On receipt of this list and the map information from the database readout and information processing program 54, the user-oriented data delivery program 57 combines the received list with the map information and plots the points at which image pickup has been completed on the map. The user-oriented data delivery program transmits the data, illustrated in the figure, with the image pickup time added to the user as Web data. The processing from the acceptance of the user's access up to this point is processing performed by the image server 5 at Step 525. The user can view this Web data using a Web browser (Step 528).

To view the images of the points plotted on the figure, the user who received this Web data specifies the place of image pickup of an image the user desires to view, and requests delivery of the image and the image pickup information (Step 530). Then, the user-oriented data delivery program 57 receives this request for delivery, and requests the specified image and the image pickup information from the database readout and information processing program 54.

The database readout and information processing program 54 receives this request, and searches the picked image database 51 for the requested image and the image pickup information. When the result of the search reveals that they exist, the database readout and information processing program 54 reads the image and the image pickup information out of the picked image database 51. The database readout and information processing program reads map information about the vicinity of the position in the position information, described in the image pickup information, out of the map information database 52. It transmits the image, the image pickup information, and the map information to the user-oriented data delivery program 57.

On reception of this transmission, the user-oriented data delivery program 57 delivers the above items to the requesting user as Web data. The processing performed by the user-oriented data delivery program 57 and the database readout and information processing program 54 after the user-oriented data delivery program 57 receives the request to deliver the image and the image pickup information corresponds to Step 535.

Figure 11:
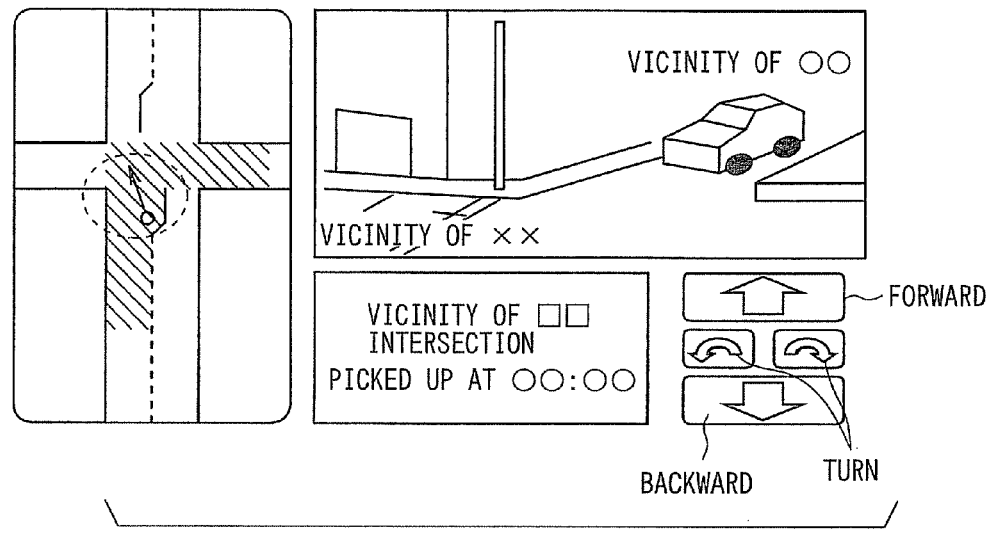
FIG. 11 is a drawing illustrating an example of the way Web data from the image server 5 is displayed using a Web browser on the user side.

The Web data interactively varies according to request signals from the user-side Web browser. FIG. 11 illustrates an example in which this Web data is displayed using a Web browser. In the example illustrated in FIG. 11, data is displayed in a split screen using the multiframe function of HTML. The upper right window panoramically shows the portion of the omnidirectional image, requested by a user, in some direction range at some instant. In this window, however, characters "Vicinity of XX" are displayed at the lower left corner and characters "Vicinity of OO" are displayed at the upper right corner, together with the image. XX and OO are place names. This display can be implemented by taking the following procedure: at the stage of Web data creation, the user-oriented data delivery program 57 correlates the direction information contained in the image pickup information to the image. It determines the directions in which roads are extended from the intersection in this window, and links the map information with the position of the vehicle in the image pickup information. It determines what road this is and to what place this road runs, and incorporates the result of this determination into the user interface.

In the left window, a map is displayed. This map indicates the image of what position the presently displayed image is and in which direction the image is obtained. What are depicted like strips in this map refer to roads, and the circle in the map indicates the position of the vehicle. The arrow indicates the direction of the line of sight, that is, the direction of the center of the presently displayed image. The diagonally shaded area in the map indicates an area whose image pickup data is present, that is, the area whose image was picked up at this vehicle. These items can be displayed by the user-oriented data delivery program 57 linking the positions of roads and the shapes of lanes in the map information with the position of the vehicle and the direction information contained in the image pickup information.

The window positioned in the lower center indicates the current position information and the information about image pickup time contained in the image pickup information in characters. These pieces of information can be displayed by linking the positions of roads in the map information with the position of the vehicle and the image pickup time in the image pickup information.

At the lower right, there are four user-operable windows. These windows allow the upper-right image to be interactively changed: they cause forward travel toward the displayed image (i.e. in the direction of the center of the displayed image), the displayed image to recede directly to the far side, or the point of view to turn to the left or right. This can be implemented using, for example, the technology of Java (registered trademark), cgi, or the like. Thus, the user-oriented data delivery program 57 delivers the interactive interface as mentioned above. As a result, users can enjoy a visual effect with which they can feel as if they traversed, looking around, in places in which images were picked up.

Images delivered from the image server 5 are those selected under the same filtering condition. Therefore, uncomfortable feeling is lessened when images are continuously displayed.

The following operation is implemented by the above-mentioned action of the image server 5 and the image control computer 10: the image server 5 receives a request to deliver the image of a specified place of image pickup from a user through networks. The image server 5 delivers the image of the specified place of image pickup to the user. The image control computer 10 receives an order of a position in which an image is picked up with the omnidirectional camera 21 mounted on the vehicle from the image server 5. The image control computer 10 picks up the image with specified timing, and transmits the image picked up and the image pickup information to the image server 5 through the wireless communication device 25.

The image server 5 receives the image picked up at the vehicle and the image pickup information from the image control computer 10 by wireless communication, and delivers this image and the image pickup information to the user. For this reason, according to a request from a user who is not in the vehicle, the image of the surroundings of the vehicle can be uploaded to the image server 5 that delivers images to the fixed terminal 36, in-vehicle terminal 37, and the like.

In this embodiment, the database readout and information processing program 54 is so constructed that, when an image transmitted from the vehicle 1 is stored in the picked image database 51, an image is selected based on the above-mentioned filtering condition. Instead, selection of an image using the filtering condition may be carried out when an image stored in the picked image database 51 is read out and passed to the user-oriented data delivery program 57. In this case, the database readout and information processing program 54 stores all the images and image pickup information, passed from the image conversion program 58 and the image pickup information processing program 56, in the picked image database 51. When the image of some area is requested by the user-oriented data delivery program 57, one is selected from among the images of that area stored in the picked image database 51 using the above-mentioned filtering condition. Then, the selected image is outputted to the user-oriented data delivery program 57.

That is, images ultimately delivered to the fixed terminal 36 or the in-vehicle terminal 37 only have to be those selected according to a filtering condition. Actual selection may be carried out before or after storage into the picked image database 51.

Second Embodiment

Next, description will be given to a second embodiment of the present invention only with respect to differences from the first embodiment. In this embodiment, the constitution of the fixed terminal 36 and the in-vehicle terminal 37 is a major difference from the first embodiment.

Figure 12:
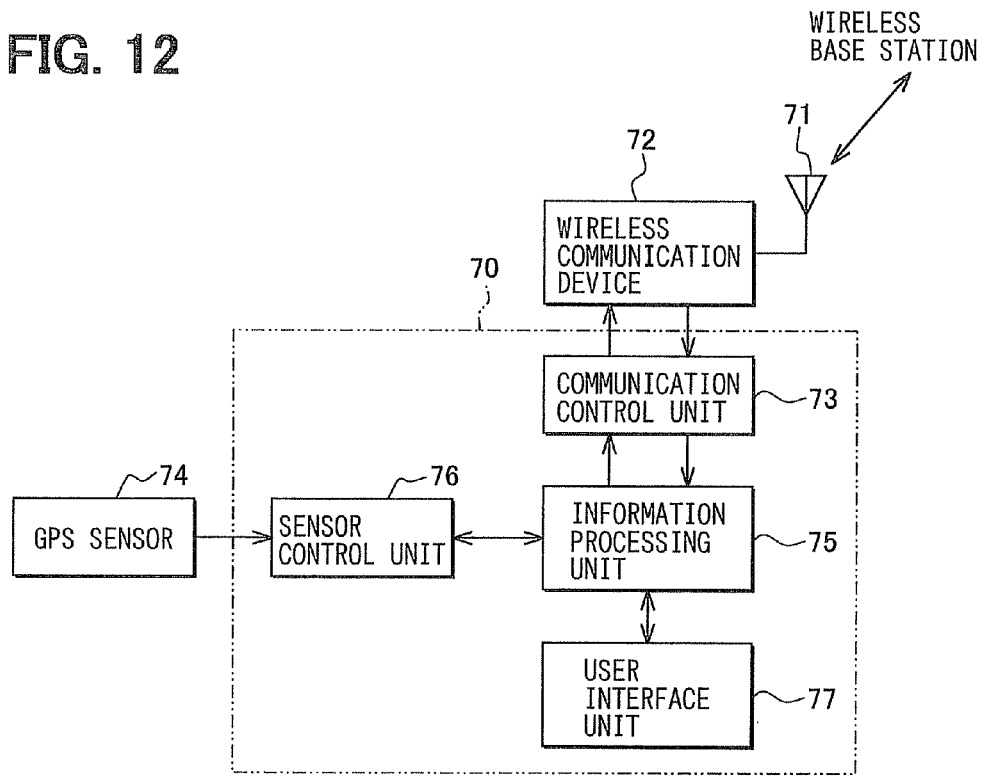
FIG. 12 is a drawing illustrating the configuration of the fixed terminal 36 and the in-vehicle terminal 37 as in-vehicle equipment.

FIG. 12 illustrates the configuration of the fixed terminal 36 and the in-vehicle terminal 37 as in-vehicle equipment. This communication device comprises a radio antenna 71, a wireless communication device 72, a GPS sensor 74, and a control computer 70. The wireless communication device 72 wirelessly communicates communication data through a wireless base station connected with a wide area network 8 using the radio antenna 71. The GPS sensor 74 is the same as the GPS sensor 22 illustrated in FIG. 2.

The control computer 70 has a sensor control unit 76, a communication control unit 73, an information processing unit 75, and a user interface unit 77. The sensor control unit 76 periodically (e.g. once per second) controls the GPS sensor 74 to acquire information about the position of the relevant vehicle, and stores the acquired position information in a buffer memory that is not shown. The contents of the buffer memory are updated each timer the GPS sensor 74 receives new position information.

The communication control unit 73 controls the wireless communication device 72 to acquire the data of radio signals received by the wireless communication device 72, and outputs it to the information processing unit 75. The communication control unit 73 receives data to be wirelessly transmitted, from the information processing unit 75, and outputs this data to the wireless communication device 72. Also, the communication control unit controls and causes the wireless communication device 72 to wirelessly transmit the outputted data.

The user interface unit 77 is integrally provided with an image display device, an audio output device, and an input device. The user interface unit 77 displays information for the user under the control of the information processing unit 75. When the user interface unit 77 accepts an input from the user, the unit outputs it to the information processing unit 75.

The information processing unit 75 has CPU (not shown) that fetches a program from ROM, which is not shown, in the control computer 70, executes it, and thereby operates. The CPU communicates control signals and data with the sensor control unit 76, communication control unit 73, and user interface unit 77 according to instructions from programs. The program for the operation of the CPU will be described later. In the following description, the operation of the CPU will be regarded as the operation of the information processing unit 75 unless otherwise noted.

Figure 13:
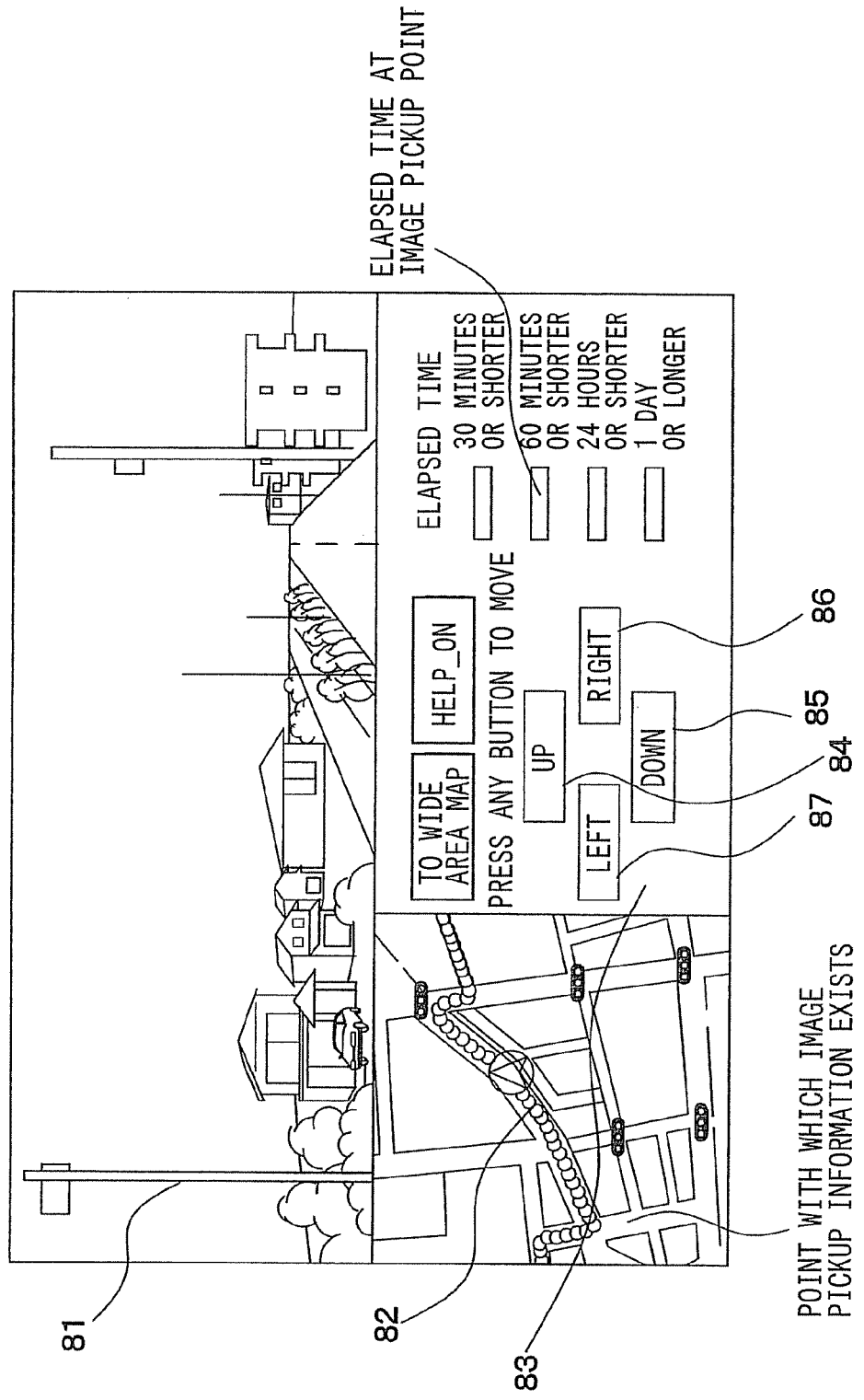
FIG. 13 is a drawing illustrating information displayed on a user interface unit 77.

As in the first embodiment, the fixed terminal 36 and the in-vehicle terminal 37 in this embodiment cause the user interface unit 77 to display information based on images and image pickup information transmitted as Web data from the image server 5. FIG. 13 shows a screen display image indicating this information.

This screen display image comprises: an image display portion 81 for displaying a picked image transmitted from the image server 5; a map display portion 82 for displaying a map together with a mark for the position of the image presently displayed in the image display portion 81; and an operating portion 83 for the user to perform operation, such as pressing a button, to input instructions.

The information processing unit 75 requests information about the point at which an image was picked up from the image server 5. On receipt of a list of image pickup points in response to the request, the information processing unit displays the relevant image pickup point (corresponding to the point circled in the figure) in the map display portion 82. At this point, the image pickup point is displayed in different colors depending on image pickup time. The instruments and devices (not shown) on the fixed terminal 36 and in-vehicle terminal 37 side have map data stored therein, and the information processing unit 75 can use this map data when drawing a map.

The program that gives this screen display image is so constructed that, when it detects that an up button 84, down button 85, right button 86, left button 87, or the like is pressed by the user, it operates based on the pressed button. Specific description will be given. When the up button 84 is pressed, the image of an area in which the vehicle is when it travels in the direction corresponding to the center of the image presently displayed in the image display portion 81, that is, in the forward direction is requested from the image server 5. Then, the image is received and displayed. When the down button 85 is pressed, the image of an area in which the vehicle is when it travels in the direction opposite the direction corresponding to the center of the image presently displayed in the image display portion 81 is requested from the image server 5. Then, the image is received and displayed.

When the right button 86 or the left button 87 is pressed, the presently displayed image is shifted to the left or the right, and the right end portion or left end portion of the image that gets out of the screen as the result is displayed at the right end or the left end of the image display portion 81. Thus, pressing the right button 86 or the left button 87 makes it possible to display the 360°-image with the corresponding part positioned in front.

Figure 14:
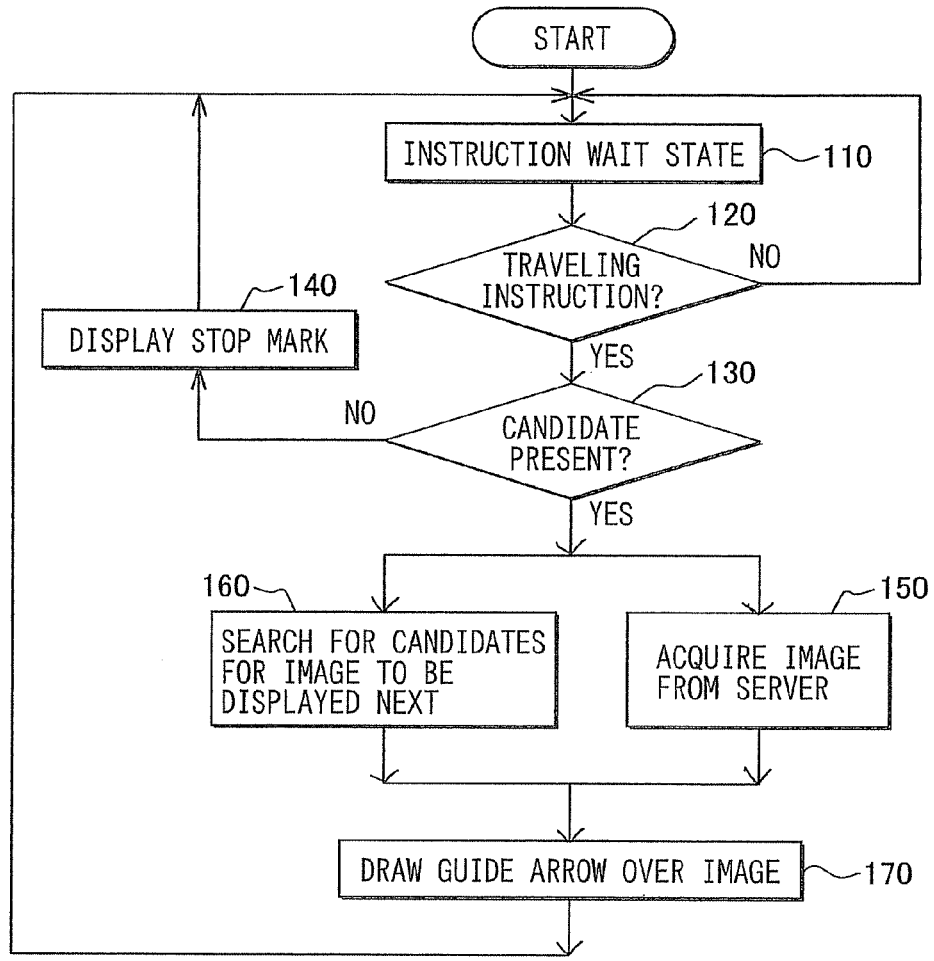
FIG. 14 is a flowchart illustrating in more detail the portion of an image display program associated with depression of an up button 84.

FIG. 14 is a flowchart illustrating in more detail the portion of the program that gives the above-mentioned screen display image (referred to as "image display program") associated with depression of the up button 84.

At Step 110, the processing waits until any button 84 to 87 or the like is pressed by the user. When the operation by the user is detected, the processing proceeds to Step 120, and it is determined whether the operation is to give an instruction to advance in the direction of forward travel, that is, whether the up button 84 is pressed or not. When the up button 84 is not pressed, the processing returns to Step 110. When the up button 84 is pressed, the processing proceeds to Step 130.

Figure 15:
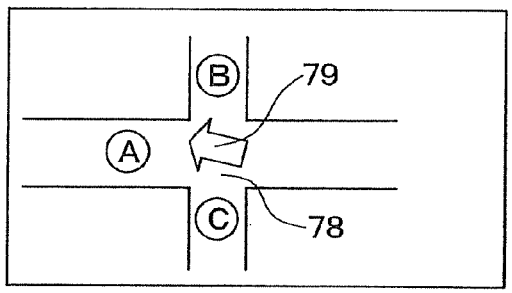
FIG. 15 is a conceptual diagram illustrating a typical case in which the up button 84 is pressed.

At Step 130, it is determined whether an image corresponding to the traveling direction exists in the image server 5 or not. This determination is carried out using the proximity point search algorithm described below. FIG. 15 is a conceptual diagram illustrating a typical case in which the up button 84 is pressed, as mentioned above. It will be assumed that the picked image of an intersection 78 is displayed in the image display portion 81 with the portion indicated by an arrow 79 positioned in the center, and picked images in nearby positions A, B, and C are stored in the picked image database 51 of the image server 5. When the up button 84 is pressed in this case, it is determined which image should be displayed, that in position A, that in position B, or that in position C. The proximity point search algorithm is a method for this determination.

Figure 16:
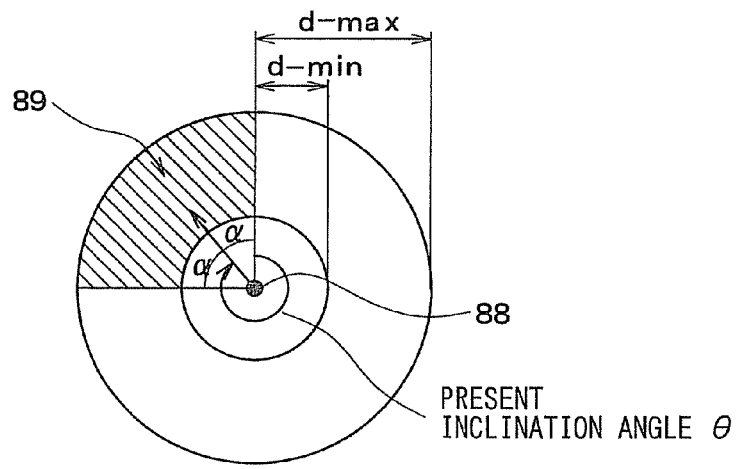
FIG. 16 is an explanatory drawing of a proximity point search algorithm.

Description will be given to the proximity point search algorithm with reference to the explanatory drawing of FIG. 16. θ will be taken as the clockwise angle of the direction corresponding to the center of the presently displayed image to the direction of the north. The fan-shaped region 89 defined below will be taken as search region: the region that is positioned between angle θ−α (α is 45°, for example) and angle θ+α relative to the direction of the north and is sandwiched between two arcs whose center agrees with the image pickup point 88 of the image presently displayed in the image display portion 81 and whose radiuses are d-max and d-min.

Figure 17:
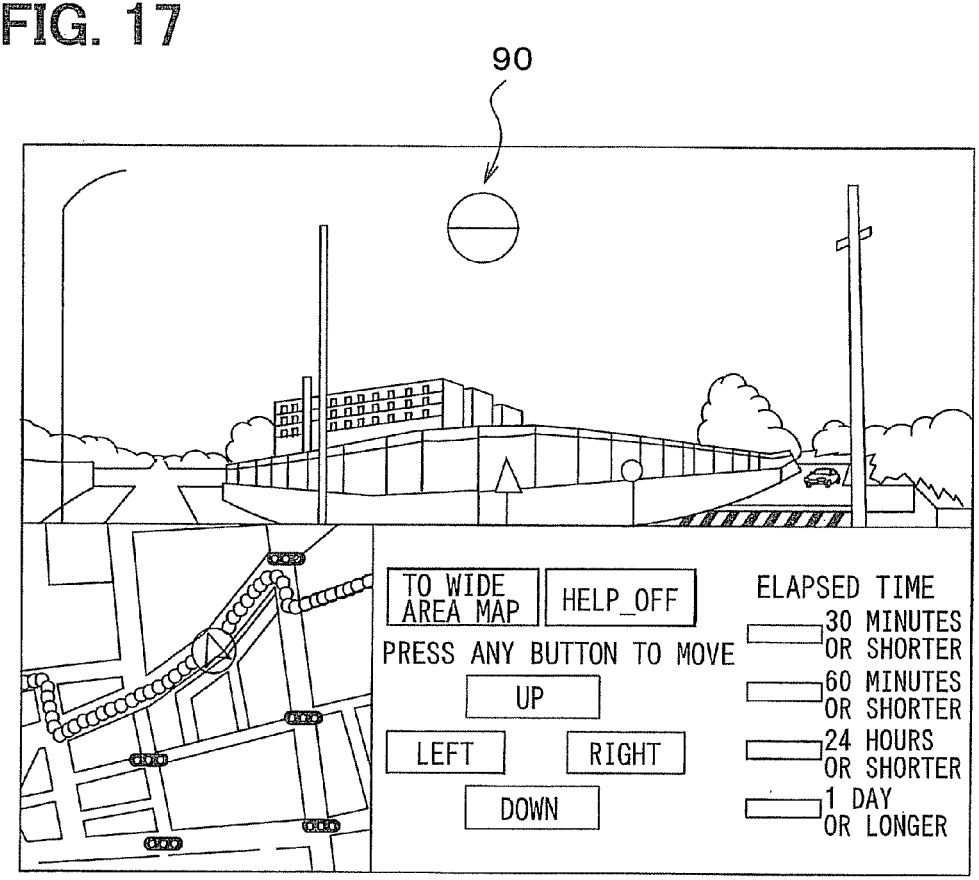
FIG. 17 is a drawing illustrating the way a stop mark 90 is displayed in an image display portion 81.

A list of images picked up in this search region, that is, a list of the candidates for the next image is requested from the image server 5. When the response from the image server 5 indicates that there is no candidate, the processing proceeds to Step 140. As illustrated in FIG. 17, a stop mark 90 is displayed over the screen display image, and the processing thereafter proceeds to Step 110. When the stop mark is displayed when there is no candidate for the next image, the user can visually recognize that there is no candidate.

When information indicating that there is one candidate for the next image is acquired, the processing of Step 150 and that of Step 160 are performed in parallel with the candidate taken as the image to be displayed next. When there are a plurality of candidates for the next image, that is, when there are a plurality of corresponding images in the above-mentioned search region, the following procedure is taken: one is selected as the image to be displayed next, from among them by a predetermined selection rule, and the processing of Step 150 and that of Step 160 are performed in parallel with the selected one taken as the image to be displayed next. Various methods can be used for the predetermined selection rule. Such methods include: a method in which the image whose image pickup time is latest should be preferentially selected; a method in which the image picked up when the vehicle speed was lowest should be preferentially selected; a method in which the image whose image pickup time is closest to that of the presently displayed image should be preferentially selected.

At Step 150, a delivery of the image selected at Step 130 is requested to the image server 5, and the requested image and the image pickup information are received from the image server 5. At Step 160, candidates for the image to be displayed next are searched for at the image pickup point of the image selected at Step 130. More specific description will be given. Eight directions, north, northeast, east, southeast, south, southwest, west, and northwest, are taken as traveling directions, and it is inquired of the image server 5 whether there is any candidate in each traveling direction relative to the relevant image pickup point. When the above-mentioned proximity point search algorithm reveals that there are a plurality of candidates, one is selected as the candidate for the image to be displayed next from among them.

Figure 18:
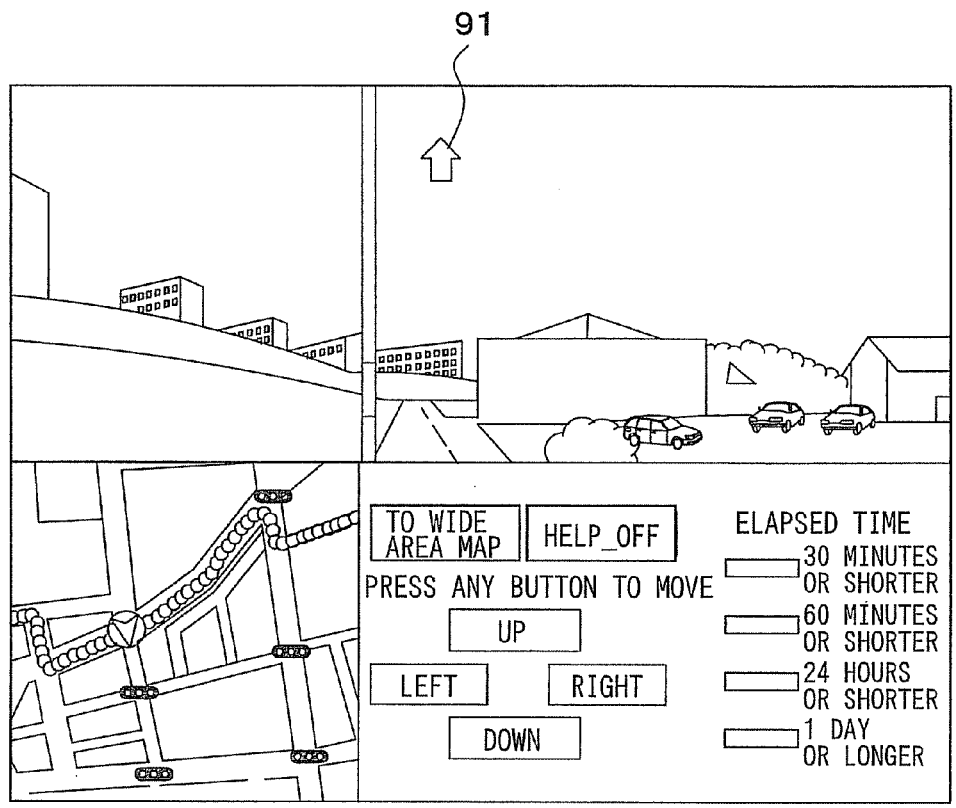
FIG. 18 is a drawing illustrating the way a guide arrow 91 is displayed in the image display portion 81.

When the processing of Step 150 and Step 160 is completed, the processing proceeds to Step 170. The image acquired at Step 150 is displayed in the image display portion 81, and the map with the image pickup point of the image positioned in the center is displayed in the map display portion 82. In addition, with respect to the directions in which there are candidates at Step 160, arrows 91 indicating these directions are displayed in the image display portion 81, as illustrated in FIG. 18. Thus, the user can learn in which direction the user should move to view the next image. After Step 170, the processing returns to Step 110.

Owing to the above-mentioned processing by the information processing unit 75, the user can display the following driving aids over the image delivered from the image server 5 and displayed: a mark indicating that traveling is impossible, illustrated in FIG. 17, or a guide arrow indicating a traveling direction, illustrated in FIG. 18. Thus, picked images can be smoothly displayed.

Third Embodiment

Description will be given to a third embodiment of the present invention. A difference of this embodiment from the second embodiment is as follows: when the up button 84 is pressed, the image display program may control the orientation of the image to be displayed next based on the orientation in which the image was when it was picked up.

Figure 19:
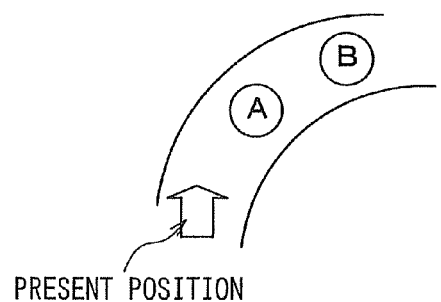
FIG. 19 is a drawing illustrating a case in which an effect of a third embodiment is characteristically produced.

FIG. 19 is a drawing illustrating a case where an effect of this embodiment is characteristically produced. It will be assumed that the image display program presently displays an image picked up at the portion of a curved road where an arrow is present, and the orientation of the displayed image agrees with the direction of the arrow. When the up button 84 is pressed in this case, point A the picked image of which is present in the image server 5 comes in the fan-shaped search region illustrated in FIG. 16. Therefore, the image display program displays the picked image of point A with its orientation agreeing with the direction of the arrow.

When the up button 84 is pressed next, the departure between the direction of the line extended from point A to point B and the direction of the arrow is increased and point B may not come in the search region. In this case, a problem can arise even when picked images along the road are displayed. When there is no change in the forward direction, the dead end mark illustrated in FIG. 17 can be displayed by continuously pressing the up button 84, which means forward travel.

To cope with this, the image display program performs the following operation in this embodiment: when the up button 84 is pressed under a predetermined condition, it takes as the orientation of the image to be displayed next the orientation in which the image was when it was picked up or the orientation opposite thereto.

Figure 20:
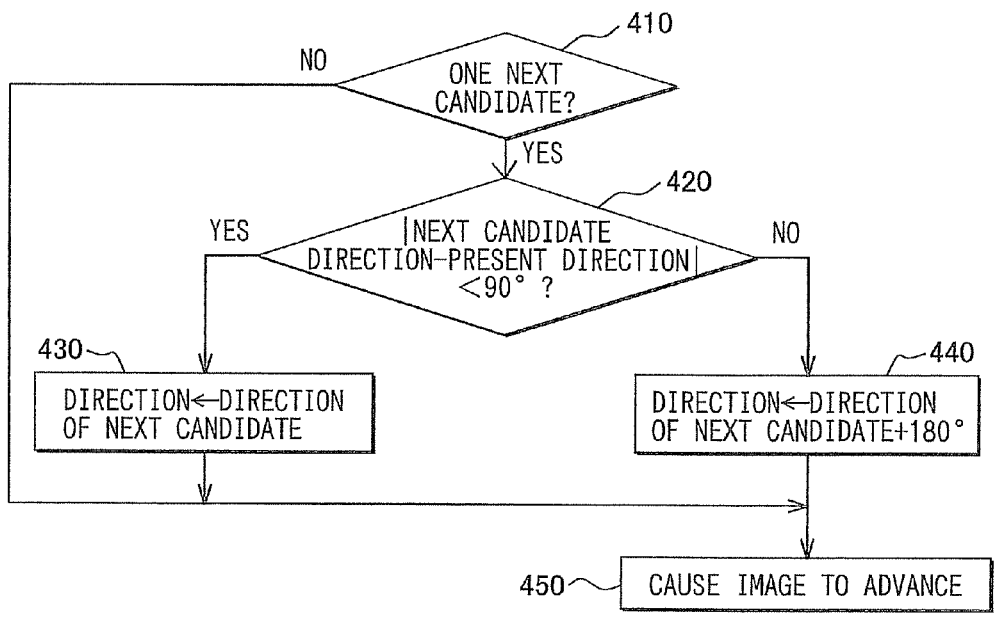
FIG. 20 is a flowchart of processing for matching the orientation of an image displayed next with the orientation in which the image was when it is picked up or the orientation opposite thereto.

FIG. 20 is a flowchart illustrating part of the image display program for implementing the above-mentioned operation. This flowchart illustrates in detail Step 170 of FIG. 14.

At Step 410, it is determined whether the number of next candidates is one or not. Next candidate refers to an area to which the display can be moved by pressing the up button 84. More specific description will be given. It is determined whether it was determined or not at Step 130 that there were a plurality of next candidates. In the example illustrated in FIG. 19, this operation corresponds to determination of whether a point to which the image can be moved from the current position by pressing the forward travel button exists other than point A or not. When the number of next candidates is not one, the processing proceeds to Step 450. When the number of next candidates is one, the processing proceeds to Step 420.

At Step 420, it is determined whether the absolute value of the angle difference between the next candidate direction and the present direction is less than 90°. That is, it is determined whether the absolute value of the angle difference between the following direction and orientation is less than 90°. Here, the direction is a direction in which the picked image displayed, instead of the previous one, next time or immediately after the up button 84 is pressed was picked up while the orientation is orientation of the image displayed this time or immediately before the up button 84 is pressed. (This orientation corresponds to the direction of forward travel.) When the absolute value of the angle difference is less than 90°, the processing proceeds to Step 430; when it is equal to or greater than 90°, the processing proceeds to Step 440. Next candidate direction refers to the orientation in which the vehicle 1 was when the image of the next candidate was picked up. In the example illustrated in FIG. 19, the next candidate direction is the orientation of the vehicle 1 that picked up the image at point A. Present direction refers to the direction corresponding to the portion of the image presently displayed as a forward-direction image by the image display program. In the example illustrated in FIG. 19, the present direction is the direction of the arrow.

At Step 430, the next-time direction is taken as the next candidate direction. Next-time direction refers to the direction corresponding to the forward-direction portion of the displayed image when the image display program displays the image of the next candidate. As mentioned above, the orientation of the image to be displayed next is matched with the orientation in which the image was when it was picked up. This prevents increase in the angle formed by the orientation of the screen display image, and the orientations of the next candidate and the candidate after next. Therefore, images along a road can be displayed by continuously pressing the up button 84.

However, when the direction in which the vehicle 1 is running when images are picked up and the order of display along the road by the image display program are opposite to each other, the following procedure is required to cause the display to advance along the road by pressing the up button 84: the orientation of the image to be displayed next must be matched with the direction opposite the direction in which the image was picked up. To cope with this case, the following procedure is taken when the absolute value of the angle difference is equal to or greater than 90° at Step 420, that is, when there is a great possibility that the order of image display and the running direction of the vehicle 1 at the time of image pickup are opposite to each other: At Step 440, the direction obtained by adding 180° to the next candidate direction, that is, the direction opposite the next-time direction is taken as the next-time direction.

After the processing of Step 430 and that of Step 440, other processing of Step 170 in FIG. 14 is performed at Step 450. More specific description will be given. At this step, picked images are displayed with the direction identified at Step 430 or 440 taken as the forward direction, the guide arrow is displayed, and other like processing is performed. Thereafter, the processing illustrated in FIG. 20 is terminated.

Fourth Embodiment

Description will be given to a forth embodiment of the present invention. The first to third embodiments are so constructed that with respect to images that are received from the vehicle 1 or the like by the image server 5 and belong to the same area, only one of them is stored in the picked image database 51. Meanwhile, this embodiment is so constructed that with respect to one area, a plurality of images can be stored. More specific description will be given. With respect to images of one and the same area, an image picked up when the vehicle 1 is running in one running direction and an image picked up when the vehicle is running in the direction opposite thereto are stored in the picked image database 51. That is, when there are a plurality of images with respect to each of segments, one is selected from among them. The segment is identified by area to which the image pickup point belongs and combination of forward direction and backward direction in which the vehicle 1 is running when the images are picked up. The constitution and operation of the vehicle 1, image server 5, fixed terminal 36, and in-vehicle terminal 37 are the same as in the second embodiment unless otherwise noted with respect to this embodiment.

Figure 21:
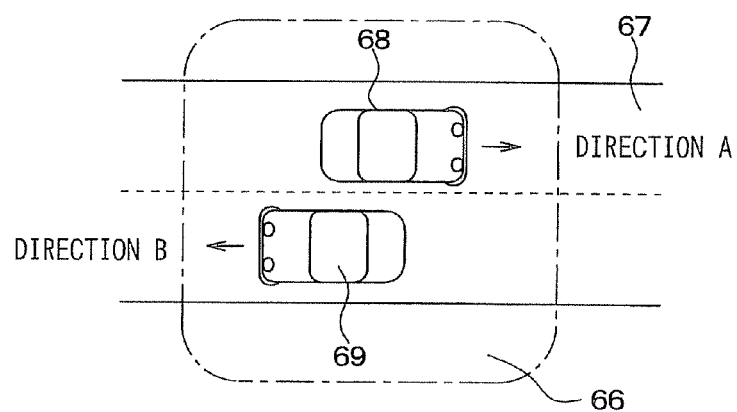
FIG. 21 is a schematic diagram illustrating a characteristic element of a forth embodiment.

FIG. 21 is a schematic diagram illustrating a characteristic element of this embodiment. Vehicles 68 and 69 as probe cars are running in an area 66 including part of a double-lane road 67. When images picked up by these vehicles 68 and 69 in this area 66 are transmitted to the image server 5, the two images are regarded as images in opposite directions. These images in opposite directions do not eliminate each other by the filtering condition described with respect to the first embodiment.

Specifically, the filtering condition in this embodiment is as follows: the image of some area is received from the vehicle 1 through the image conversion program 58. When there is an image that belongs to the same area as the above image and whose orientation is the same as the orientation in which the vehicle 1 was when the image was picked up, the database readout and information processing program 54 selects one from among these two images on the filtering condition of the first embodiment. The database readout and information processing program stores only the selected one in the picked image database 51. When the image of some area is received from the vehicle 1 and there is an image that belongs to the same area as the former image and whose orientation is opposite to the orientation in which the vehicle 1 was when the former image was picked up, both these two images are stored in the picked image database 51.

That two images are opposite to each other in orientation means that the angle formed by these two orientations is equal to or above a certain threshold angle. When the angle formed by these two orientations is not equal to nor above a certain threshold angle, they are regarded as being identical. Thus, images in both directions on a road in some area can be delivered, and delivered images give less uncomfortable feeling to the users of the fixed terminal 36, in-vehicle terminal 37, and the like.

Figure 22:
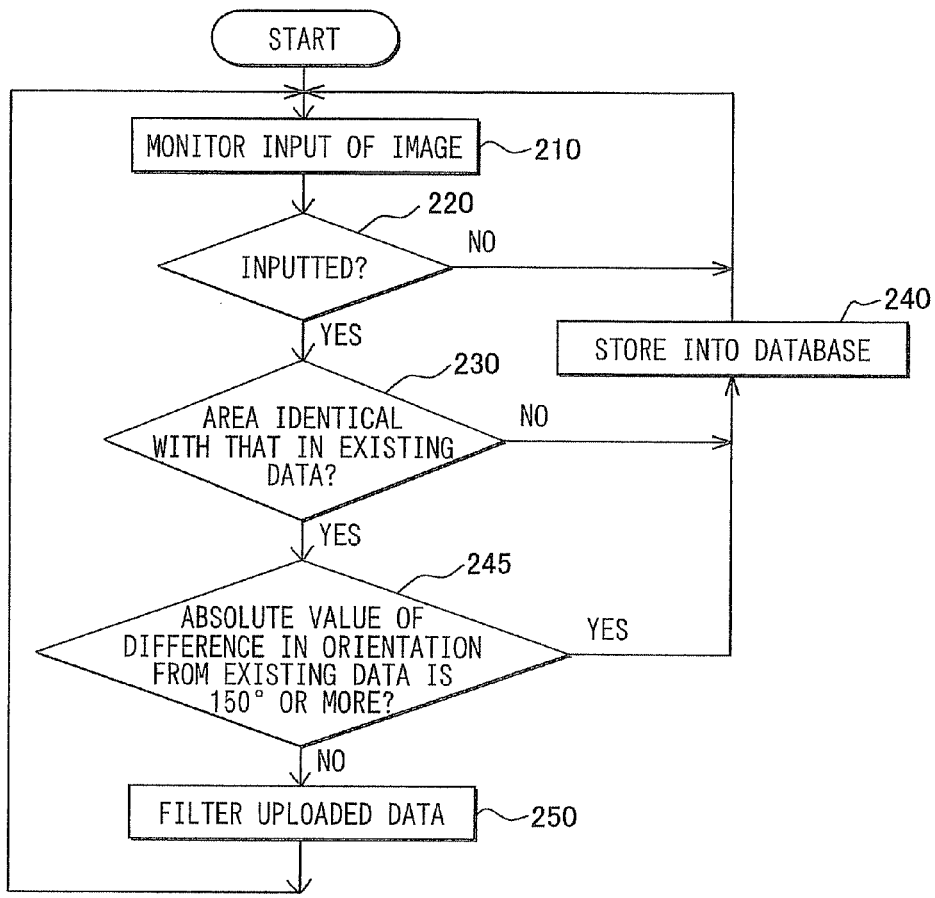
FIG. 22 is a flowchart illustrating the portion of processing carried out by the database readout and information processing program 54 in which a filtering condition is used.

FIG. 22 is a flowchart illustrating the portion of processing carried out by the database readout and information processing program 54 when it stores an image, received from the image conversion program 58, in the picked image database 51, in which portion the above-mentioned filtering condition is used. In the steps in FIG. 10 and in FIG. 22 marked with the same numbers, the same processing is carried out, and the description of the processing of these steps will be omitted.

At Step 245, the following is determined: whether the image in the picked image database 51, judged as an image of the same area at Step 230, and the image inputted from the image conversion program 58 this time are different from each other in the orientation in which the vehicle was when they were picked up by 150°, which is the threshold angle, or more. When the result of judgment is affirmative, the processing proceeds to Step 240, and the inputted image is stored in the picked image database 51. When the result of judgment is negative, one is selected from among the two images by the filtering condition at Step 250. Thus, images in both directions on a road in the same area are stored.

Figure 23:
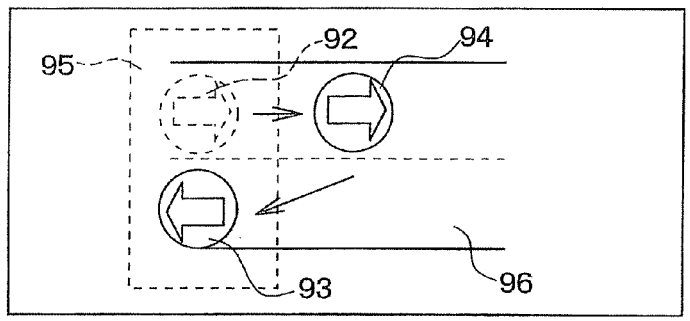
FIG. 23 is an explanatory drawing illustrating the operation performed by the database readout and information processing program 54 when stored images in both directions with respect to one area are delivered to a user.

Description will be given to the operation of the database readout and information processing program 54 performed in a case where images of one area in both directions stored in the picked image database 51 as mentioned above are delivered to the fixed terminal 36 or the in-vehicle terminal 37. FIG. 23 is a drawing illustrating this case.

Images 92, 93, and 94 were picked up on the road 96 in this figure, and these images were respectively picked up at vehicles oriented in the directions of the arrows. The image 92 and the image 93 are images that belong to one area 95 encircled with a broken line and are oriented in opposite directions.

The image 92 is presently displayed for the user at the fixed terminal 36 or in-vehicle terminal 37. When the user presses the up button 84 illustrated in FIG. 13 at this time, the following takes place: the database readout and information processing program 54 receives an inquiry signal, described with respect to Step 130 of FIG. 14, from the user through the user-oriented data delivery program 57. Thereafter, the database readout and information processing program sends the image pickup information 94 as the next candidate back to the user through the user-oriented data delivery program 57. As a result, the user acquires the image 94 by the processing of Step 150 in FIG. 14.

When the user thereafter presses the down button 85 illustrated in FIG. 13, the following takes place: the database readout and information processing program 54 receives an inquiry signal from the user, and then sends the image pickup information 92 as the next candidate back to the user through the user-oriented data delivery program 57. As a result, the user acquires the image 92 by the processing of Step 150 in FIG. 14.

However, when the user presses the right button 86 or left button 87 illustrated in FIG. 13 to take the opposite direction (leftward direction in FIG. 23) as frontward direction when the image 94 is being displayed, and then presses the up button 84, the following takes place: the database readout and information processing program 54 receives an inquiry signal from the user, and then sends the image pickup information 93 as the next candidate to the user through the user-oriented data delivery program 57. As a result, the user acquires the image 93 by the processing of Step 150 in FIG. 14.

That is, when the database readout and information processing program 54 can deliver images of one area in two directions, it delivers the image whose orientation is close to the orientation of the image presently displayed by the user.

Figure 24:
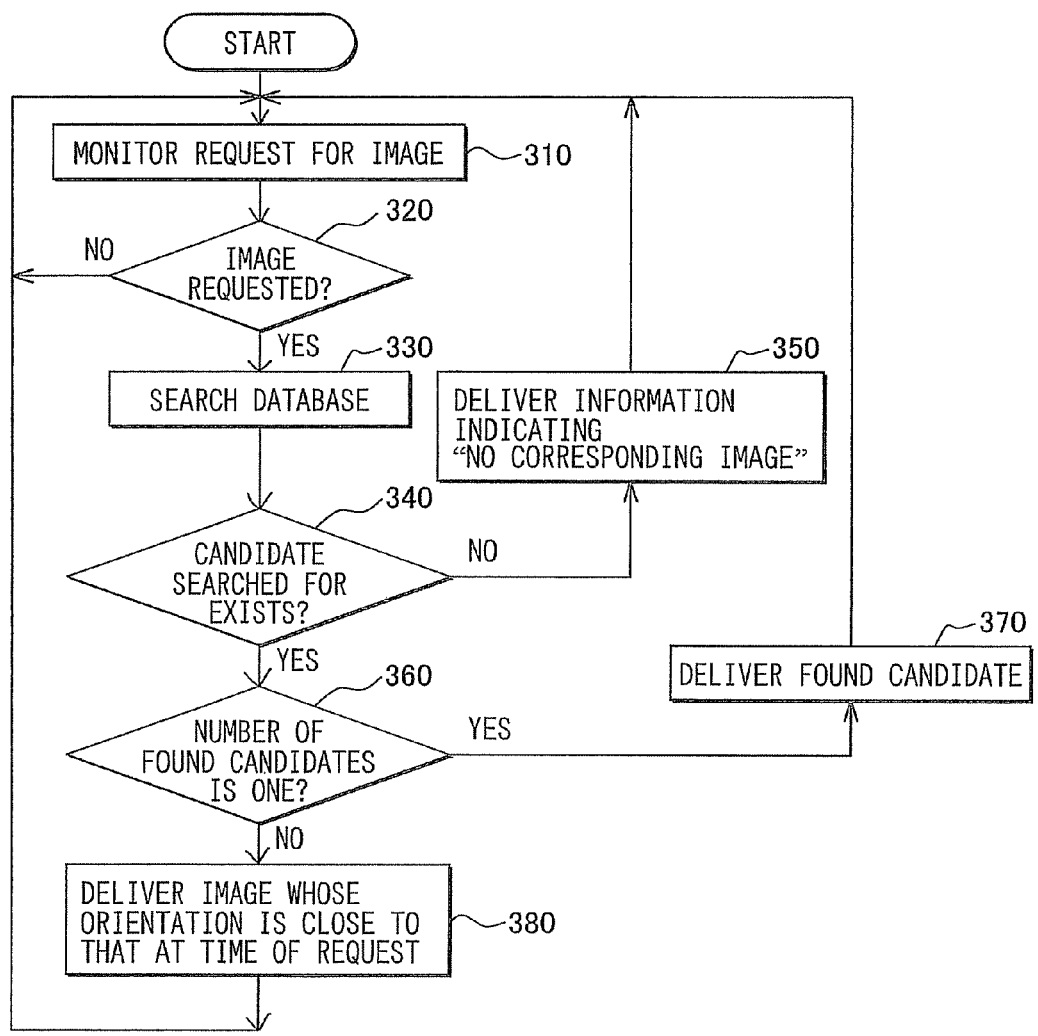
FIG. 24 is a flowchart illustrating the processing carried out by the database readout and information processing program 54 to determine the information of an image in which direction should be returned based on the information of the image in the frontward direction.

To implement the above-mentioned operation, the user takes the following procedure: when the user transmits the above-mentioned inquiry signal, the user includes the information about the orientation of the presently displayed image in the above signal. Based on this information about the orientation, the database readout and information processing program 54 determines the information of the image in which orientation it should send back. FIG. 24 is a flowchart illustrating the processing carried out by the database readout and information processing program 54 for this purpose.

At Step 310, it is monitored whether there is a request for the image of a specific area from the user-oriented data delivery program 57. When as the result of monitoring at Step 310, it is determined at Step 320 that there is a request, the processing proceeds to Step 330. When it is determined that there is not a request, the processing returns to Step 310.

At Step 330, the picked image database 51 is searched for the image of the requested area. At Step 340, it is determined whether the result of search at Step 330 reveals that the corresponding image exists or not. When the image does not exist, the processing proceeds to Step 350; when the image exists, the processing proceeds to Step 360.

At Step 350, information indicating that there is not the image of the relevant area is outputted to the user-oriented data delivery program 57, and thereafter the processing returns to Step 310. At Step 360, it is determined whether the number of the corresponding candidates is one or not. When the number is one, the processing proceeds to Step 370; when the number is more than one, the processing proceeds to Step 380.

At Step 370, the one relevant image and the image pickup information are outputted to the user-oriented data delivery program 57, and thereafter the processing returns to Step 310. At Step 380, the image whose orientation is close to the orientation at the time of request is delivered. That is, the image whose orientation at the time of pickup is close to the orientation of the image the image display program is presently displaying on the image display portion 81 is delivered. Then the processing returns to Step 310.

With respect to the images normally picked up at the vehicle 1, the lane in which the vehicle 1 is positioned differs depending on the direction of the movement. Thanks to the above-mentioned operation, the user can view images in the frontward direction, that is, images obtained in the lane corresponding to the traveling direction.

Fifth Embodiment

Description will be given to a fifth embodiment of the present invention. This embodiment is so constructed that the vehicle 1 changes the method for picking up an image according to its running speed. In addition, the vehicle 1 transmits information about its inclination at the time of image pickup and information indicating whether the place of image pickup is in an intersection or not, as image pickup information to the image server 5. The constitution and operation of the vehicle 1, image server 5, fixed terminal 36, and in-vehicle terminal 37 are the same as in the second embodiment unless otherwise noted with respect to this embodiment.

Figure 25:
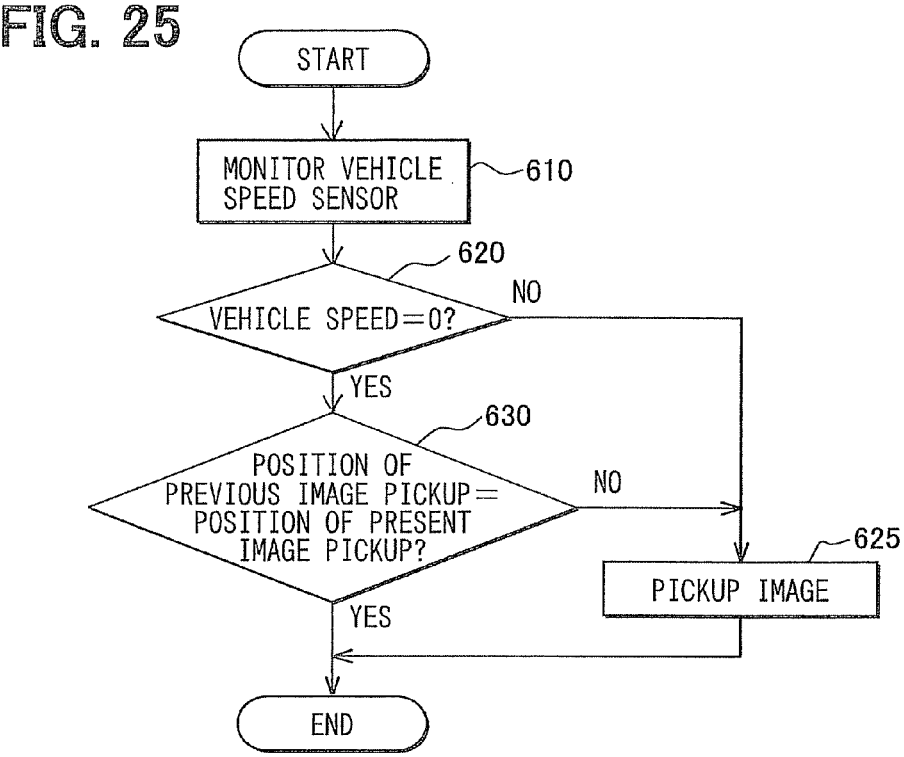
FIG. 25 is a flowchart illustrating the processing carried out by the information processing unit 13 to prevent an image from being picked up again at a point when the relevant vehicle can be considered to be in a stop at that point.

When the relevant vehicle can be considered to be in a stop, the vehicle 1 does not pick up again the image of the point at which the vehicle can be considered to be in a stop. FIG. 25 is a flowchart illustrating the processing carried out by the information processing unit 13 of the image control computer 10 for this purpose. The processing illustrated in this figure may be substituted for the processing of Step 415 in FIG. 4, or may be periodically (e.g. every five seconds) performed in place of the entire processing of FIG. 4. However, when the processing is periodically performed in place of the processing by the information processing unit 13 in FIG. 4, the processing of Step 425 to Step 435 is performed in parallel and synchronization with the processing of FIG. 25.

At Step 610, vehicle speed information is acquired from the speed sensor 24. When the speed sensor 24 is unavailable, information about vehicle speed contained in current position information from the GPS sensor 22 may be used instead.

At Step 620, it is determined whether the acquired vehicle speed is zero or so small a value that it may be approximated to zero, or not. When this judgment is affirmative, the processing proceeds to Step 630; when the judgment is negative, the processing proceeds to Step 625. At Step 625, an image is picked up with the omnidirectional camera 21, and thereafter the processing of FIG. 25 is terminated.

At Step 630, it is determined whether the previous image pickup position and the image pickup position in question are identical with each other or not. That is, it is determined whether the image of the relevant place has been picked up immediately before. Specifically, it is determined whether the image pickup position contained in the image pickup information previously picked up and the current position contained in the current position information from the GPS sensor 22 can be considered to be identical. That they can be considered to be identical means that they are identical or that they are identical when approximated. When this judgment is negative, the processing proceeds to Step 625 and an image is picked up; when the judgment is affirmative, the processing of FIG. 25 is terminated.

This processing brings the following advantage: when the vehicle can be considered to be in a stop and an image has been previously picked up at that point at which the vehicle is in a stop, an image is not picked up. Therefore, the image of a point at which the relevant vehicle is in a stop is not successively picked up twice or more.

Figure 26:
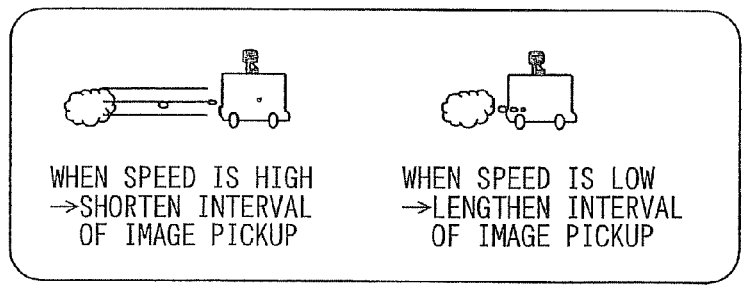
FIG. 26 is a reference drawing illustrating the procedure taken when images are repeatedly picked up: the interval of image pickup is shortened when the running speed of the vehicle is high, and is lengthened when the speed is low.

When repeatedly picking up images, the vehicle 1 shortens the interval of image pickup when the running speed of the vehicle is high, and lengthens the interval of image pickup when the speed is low. (Refer to FIG. 26.) Specifically, inverse proportionality relation is maintained between the running speed of the vehicle and the time interval of image pickup. Thus, images can be picked up at constant distance intervals.

During the processing of Step 425 in FIG. 4, the vehicle 1 includes information indicating whether the vehicle 1 is in an intersection at the time of image pickup or not, that is, an intersection flag in the image pickup information. The intersection flag is so constructed that when it is set to on, that indicates that the point at which the relevant image was picked up is in an intersection; when it is set to off, that indicates that the point at which the relevant image was picked up is not in an intersection.

Figure 27:
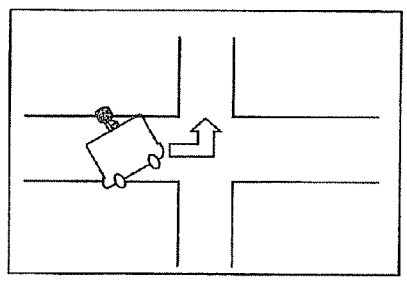
FIG. 27 is a reference drawing illustrating the following procedure: when depression of the brake pedal, blinking of the winker lamp, and depression of the accelerator pedal occur in this order, it is determined that the relevant vehicle is presently in an intersection.

The information processing unit 13 of the image control computer 10 determines whether the vehicle 1 is in an intersection when an image is picked up by various methods. (The information processing unit 13 functions as an intersection determining means by these methods.) One of the methods is such that it is determined based on current position information acquired from the GPS sensor 22 when an image is picked up and map information acquired from the map DB 18 in the memory 15. When the information processing unit 13 is capable of detecting the operations of the brake pedal, winker lamp, and accelerator pedal of the vehicle 1, the following method can be adopted: when depression of the brake pedal, blinking of the winker lamp, and depression of the accelerator pedal occur in this order, it can be determined that the relevant vehicle is presently in an intersection. (Refer to FIG. 27.) Or, the following constitution may be adopted: using an input device not shown in FIG. 2, the driver explicitly informs the information processing unit 13 that the relevant vehicle is in an intersection.

The database readout and information processing program 54 of the image server 5 may use the intersection flag added to the image pickup information as mentioned above as a criterion for the filtering condition. Specifically, an image whose image pickup information contains the intersection flag set to on may be preferentially selected regardless of other criteria of judgments.

The selection rule used when there are two or more corresponding images in one search range in the processing of Steps 130 and 160, performed on the fixed terminal 36 and in-vehicle terminal 37 side, illustrated in FIG. 14, may be such that: an image whose image pickup information contains the intersection flag is preferentially selected. Thus, a route can be easily selected in proximity to an intersection when an image is viewed, and this leads to the enhancement of operability.

The following constitution may be adopted: even when the vehicle 1 does not include the intersection flag in the image pickup information, the database readout and information processing program 54 of the image server 5 determines whether the image pickup position is in an intersection; at this time, image pickup position contained in the inputted image pickup information and map information stored in the map information database 52 are used; and the result of this determination is used as the above-mentioned criterion for the filtering condition.

Figure 28:
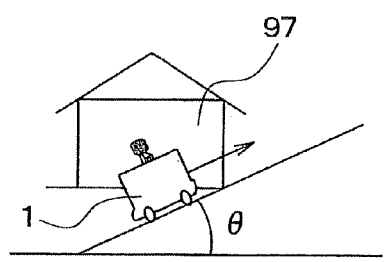
FIG. 28 is a drawing illustrating the vehicle 1 running on a slope way.

During the processing of Step 425 in FIG. 4, the vehicle 1 includes information about the angle of inclination at which the vehicle 1 is when an image is picked up, in the image pickup information. With respect to the inclination of the vehicle 1, the following constitution is adopted: the information processing unit 13 acquires information about the angle of inclination of the vehicle 1 from a 3D gyroscope, not shown in FIG. 2, for detecting the angle of inclination of the vehicle 1. (The 3D gyroscope corresponds to an amount of inclination identifying means.) Specifically, angle of inclination information refers to the angle θ formed by the traveling direction (the direction of the arrow in the figure) of the vehicle 1 to the horizontal plane, as illustrated in FIG. 28.

At the fixed terminal 36 and the in-vehicle terminal 37, image correction processing is performed using the angle of inclination information contained in the image pickup information received together with the images from the image server 5. FIG. 29 is a schematic diagram illustrating this correction processing. Even on an inclined road, a building 97 located on the roadside is usually built in the horizontal position. Therefore, in the roadside portion of an image picked up at the vehicle 1, the building 97 looks inclined by an angle of θ, as illustrated in (a) of FIG. 29.

To cope with this, the program that displays such an image as illustrated in FIG. 13 carries out correction illustrated in (b) of FIG. 29 based on the inclination information contained in the image pickup information of the relevant image when displaying the image at Step 170. More specific description will be given. When the roadside portion is displayed, letting the angle of inclination be θ, that portion is rotated in the direction opposite the angle of inclination by θ/2. When an image is rotated as mentioned above, a missing part 98 is produced in the image; therefore, the scope of display is slightly narrowed to prevent the production of a missing part. Specifically, the boundary of the scope of display is changed from rectangle 100 to rectangle 99. Thus, images can be viewed without uncomfortable feeling.

The inclination information-based correction of an image illustrated in FIG. 29 may be carried out by the database readout and information processing program 54 of the image server 5.

Sixth Embodiment

Description will be given to a sixth embodiment of the present invention. This embodiment is so constructed that the vehicle 1 picks up the images of predetermined key image pickup points in detail.

Figure 30:
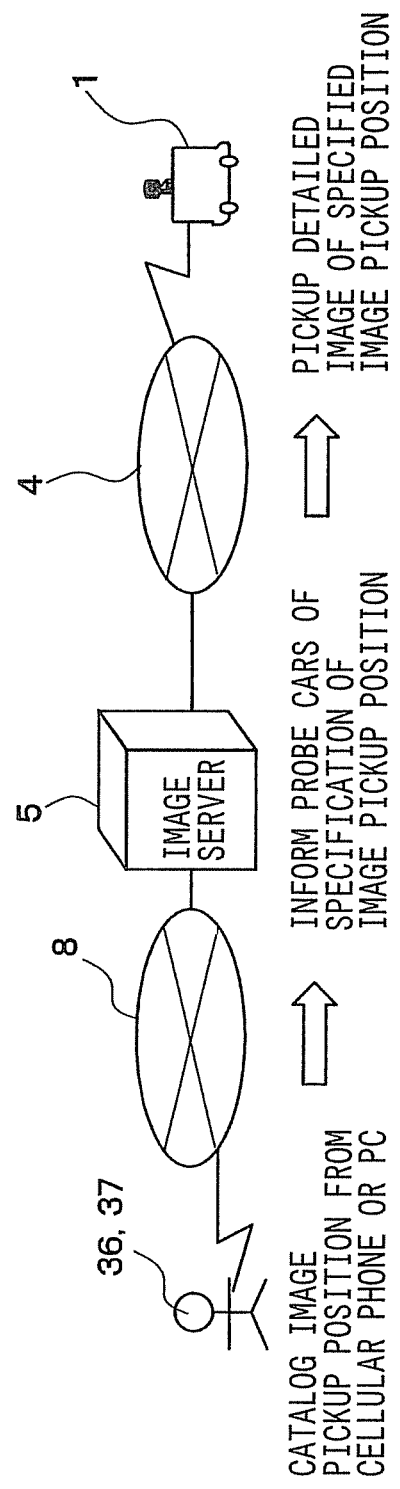
FIG. 30 is a general view illustrating an example of a system for picking up a detailed image at a key point.

Specifically, in addition to a specification of a place of image pickup, information specifying a key image pickup point is received from the image server 5. During the processing of Step 410 in FIG. 4, the information processing unit 13 also determines whether the vehicle has come close to the relevant key point. When it determines that the vehicle has come close to the key point, the image of the point is picked up in more detail than usual at Step 415. FIG. 30 is a general view illustrating an example of a system for picking up such detailed images. Specification of a key point from the image server 5 may be triggered by a request signal from the fixed terminal 36 or the in-vehicle terminal 37.

An example of methods for picking up an image in more detail than usual is such that the time interval for image pickup is shortened. For example, the usual operation in which images are picked up at intervals of five seconds is changed to the operation in which images are picked up at intervals of 0.5 seconds. Another example is such that the speed of the vehicle 1 is automatically lowered with the time interval of image pickup unchanged. The distance intervals of image pickup can be virtually shortened also by this method. Or, the following constitution may be adopted: a signal is outputted from the information processing unit 13 to a display device (e.g. display and speaker), not shown in FIG. 2, mounted in the vehicle 1, and the occupants of the vehicle 1 are instructed to pick up a detailed image.

Figure 31:
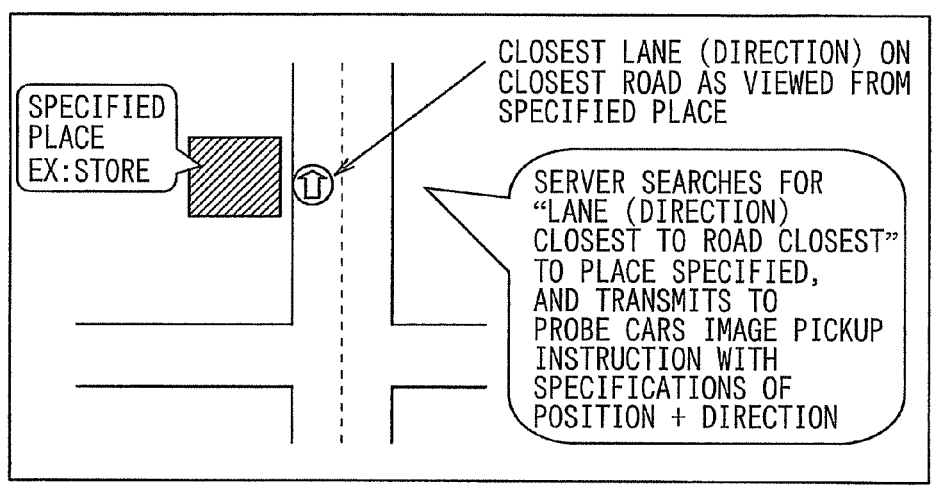
FIG. 31 is a reference drawing illustrating a case in which determination of whether the relevant vehicle has come close to a key point is carried out based on determination of whether the vehicle has come close to a point on a road closest to the specified key point.

The specified key point may be some point on a road or a point, such as a store, not on a road. In case a key point is a point not on a road, determination of whether the vehicle has come close to the key point is carried out by determining whether the vehicle has close to a point on the road closest to the specified key point. (Refer to FIG. 31.)

Thus, the user can view the detailed images of key points. The constitution and operation of the vehicle 1, image server 5, fixed terminal 36, and in-vehicle terminal 37 are the same as in the second embodiment unless otherwise noted with respect to this embodiment.

Seventh Embodiment

Description will be given to a seventh embodiment of the present invention. This embodiment is for solving the following problem: in the second embodiment, information from GPS satellites may not reach the vehicle 1, obstructed by high buildings, pedestrian overpasses, and the like. In this embodiment, when GPS information (including current position information, speed information, running direction, and the like) cannot be received from the GPS sensor 22, the following operation is performed: the image pickup position in which the relevant current position information could not be acquired is estimated utilizing map matching based on position information acquired when GPS information could be acquired before and after then.

Figure 32:
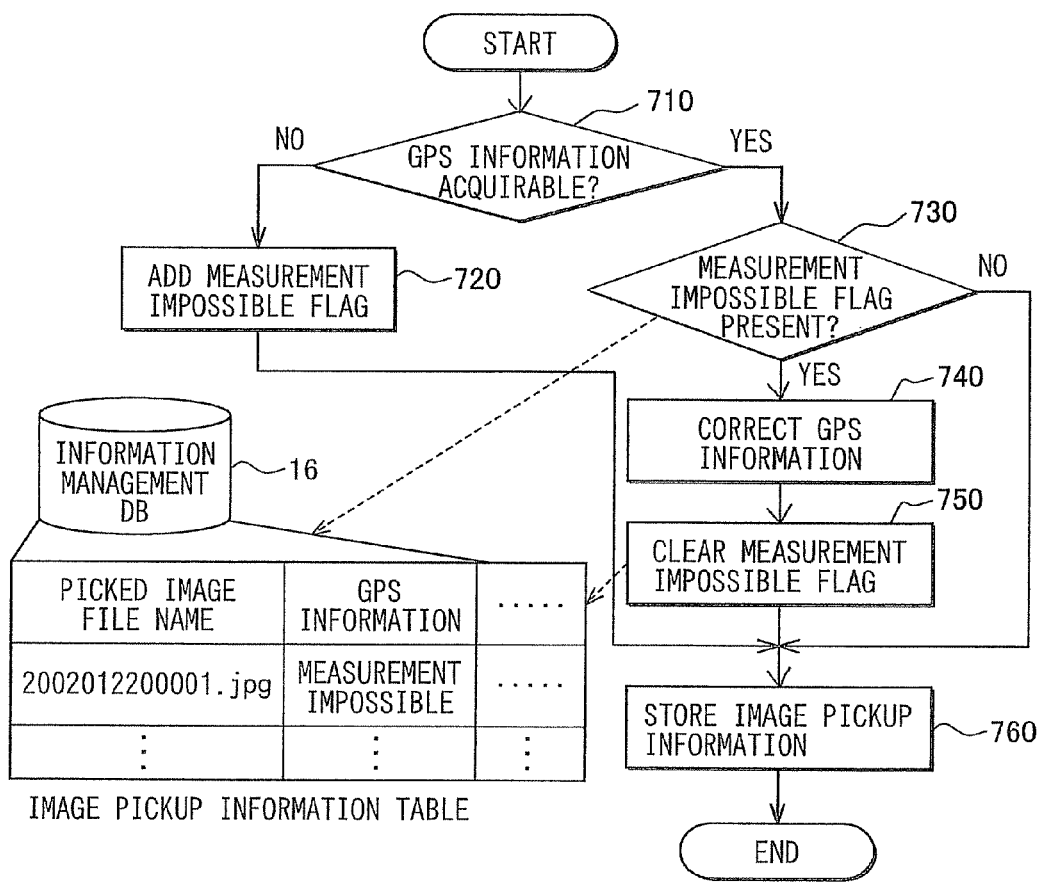
FIG. 32 is a flowchart illustrating map matching carried out when GPS information cannot be acquired.

To implement the foregoing, the information processing unit 13 of the image control computer 10 performs the processing, illustrated in FIG. 32, at Step 425 in FIG. 4. This embodiment is so constructed that images picked up by the processing of FIG. 4 are transmitted to the communication control unit 14 in a lump when the amount of them reaches a predetermined amount.

Hereafter, description will be given to the processing illustrated in FIG. 32. At Step 710, it is determined whether GPS information can be acquired or not from the GPS sensor 22 as the image pickup information of images picked up at Step 415 in FIG. 4. The GPS sensor 22 also outputs information indicating whether GPS information can be acquired or not; therefore, the above determination is carried out using this information. The following constitution may be adopted: when the current position indicated by GPS information is unchanged; nevertheless vehicle speed information outputted from the speed sensor 24 indicates that the vehicle is running, it is determined that the GPS sensor 22 has been incapable of acquiring GPS information.

When GPS information cannot be acquired, the processing proceeds to Step 720, and information indicating that measurement is impossible, that is, a measurement impossible flag is included in the image pickup information, in place of GPS information. At Step 760, image pickup information, including the measurement impossible flag, the file name of the image picked up, and information about image pickup time and the like, is stored in the information management DB 16, and thereafter the processing of FIG. 32 is terminated.

When it is determined at Step 710 that current position information can be acquired, the processing proceeds to Step 730. Then, it is determined whether image pickup information having the measurement impossible flag is present or not in the table in the information management DB 16 in which table image pickup information is placed. When the image pickup information is present, the processing proceeds to Step 740; when the information is not present, the processing proceeds to Step 760.

At Step 740, the GPS information is complemented using map matching. Specifically, the image pickup point and the running direction in the image pickup information having the image pickup impossible flag are identified using map matching based on the following pieces of information: information about current position (referred to as "position 1") and information about time (referred to as "time 1") in the GPS information acquired at Step 710; information about position (referred to as "position 2") and information about time (referred to as "time 2") contained in the latest GPS information having no measurement impossible flag in the information management DB 16; information about image pickup time (referred to as "time 3") in image pickup information having the relevant image pickup flag; and information about roads acquired from the map DB 18.

An example will be taken. It will be assumed that a route runs along a road on a map starting in position 1 and ending in position 2. A position in which the vehicle arrives when it moves from the starting point along the route by the distance expressed by the expression [(distance from position 1 to position 2 along the route)×(time 3−time 1)/(time 2−time 1)] is taken as the image pickup point in the image pickup information having the image pickup impossible flag. The orientation at the end point along the route is taken as the running direction.

At Step 750, the information about the image pickup point and running direction identified at Step 740 is taken as position information and running speed information for the image pickup information having the image pickup impossible flag. Then the image pickup impossible flag is cleared. Thereafter the processing proceeds to Step 760. The GPS information is complemented by map matching through the above-mentioned processing.

When the GPS sensor 22 can be considered not to properly function on the image server 5 side, not on the vehicle 1 side, GPS information may be complemented using map matching. This is especially effective in cases where it is difficult to determine whether GPS information is acquirable or not, for example, when the GPS sensor 22 is so constructed not as to output information indicating whether GPS information is acquirable or not. Hereafter, description will be given to the complementing of GPS information by map matching, carried out by the image server 5.

When GPS information cannot be acquired, in general, the GPS sensor continuously outputs the GPS information acquired latest. Therefore, when the vehicle 1 includes this GPS information as it is in image pickup information and transmits it to the image server 5 when the vehicle passes through a tunnel where information from GPS satellites does not arrives, for example, a problem arises: information indicating that the vehicle 1 stops for a certain time in front of the tunnel and then moves out of the tunnel in a split second is left.

To cope with this, the database readout and information processing program 54 of the image server 5 operates as follows: image pickup information from the vehicle 1 indicates that the vehicle 1 stops for a certain time and then moves by a predetermined distance or longer in a split second. In this case, the database readout and information processing program corrects the GPS information contained in the image pickup information acquired when the vehicle was in a temporary stop. The correction is carried out using the above-mentioned technique for complementing GPS information by map matching, based on the image pickup information transmitted from the vehicle 1. The constitution and operation of the vehicle 1, image server 5, fixed terminal 36, and in-vehicle terminal 37 are the same as in the second embodiment unless otherwise noted with respect to this embodiment.

Other Embodiments

In the above-mentioned embodiments, the vehicle 1 transmits picked images and image pickup information to the image server 5 by wireless communication, but the present invention is not limited to these embodiments. For example, picked images picked up at the vehicle 1 and image pickup information may be stored in a removable HDD. By connecting the HDD to the image server 5, the picked images picked up at the vehicle 1 and the image pickup information can be thereafter inputted to the image server 5.

Of the above-mentioned means, those implemented as software may be constructed as dedicated hardware.

What is claimed is:

1. An image server comprising:
a first storing medium for storing a picked image of surroundings of a vehicle, and image pickup information associated with the picked image,
the picked image being inputted from the vehicle and picked up with a camera mounted on the vehicle,
the vehicle including a speed sensor to provide a running speed of the vehicle during running; and
means for delivering a picked image stored on the first storing medium to an image display terminal that displays a received picked image, while causing the first storing medium to store an inputted picked image and image pickup information of the inputted picked image,
wherein:
the image pickup information includes information about an image pickup point at which the inputted picked image was picked up; and
the delivering means causes the first storing medium to store one image selected from among the inputted picked images with respect to each of segments of zones to which the image pickup points of the inputted picked images belong based on the image pickup information and a predetermined selection condition,
wherein:
the image pickup information further includes a running speed provided by the speed sensor of the vehicle when the inputted picked image was picked up in the vehicle; and the selection condition is such that the inputted picked image picked up when the running speed of the vehicle during the running was slowest in the segment is preferentially selected.

* * * * *